United States Patent
Li et al.

(10) Patent No.: US 10,637,725 B2
(45) Date of Patent: Apr. 28, 2020

(54) SYSTEM AND METHOD FOR NETWORK SLICE MANAGEMENT IN A MANAGEMENT PLANE

(71) Applicants: Xu Li, Nepean (CA); Nimal Gamini Senarath, Ottawa (CA)

(72) Inventors: Xu Li, Nepean (CA); Nimal Gamini Senarath, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 109 days.

(21) Appl. No.: 15/798,104

(22) Filed: Oct. 30, 2017

(65) Prior Publication Data
US 2018/0123878 A1    May 3, 2018

Related U.S. Application Data

(60) Provisional application No. 62/416,007, filed on Nov. 1, 2016, provisional application No. 62/435,011, filed on Dec. 15, 2016.

(51) Int. Cl.
*H04L 12/24*    (2006.01)
*H04L 12/911*   (2013.01)

(52) U.S. Cl.
CPC ........ *H04L 41/0803* (2013.01); *H04L 41/044* (2013.01); *H04L 41/5041* (2013.01); *H04L 47/70* (2013.01); *H04L 47/78* (2013.01)

(58) Field of Classification Search
CPC . H04L 41/04; H04L 41/0803; H04L 41/0896; H04L 41/5025; H04L 41/5041; H04L 47/70; H04L 47/78
See application file for complete search history.

(56) References Cited

U.S. PATENT DOCUMENTS

| | | | |
|---|---|---|---|
| 2006/0236026 A1* | 10/2006 | Hempel | G06F 12/1425 711/103 |
| 2013/0007232 A1 | 1/2013 | Wang et al. | |
| 2013/0047230 A1 | 2/2013 | Krishnan et al. | |
| 2015/0358399 A1* | 12/2015 | Baugher | H04L 67/1002 709/203 |
| 2016/0156513 A1 | 6/2016 | Zhang et al. | |
| 2017/0070892 A1* | 3/2017 | Song | H04L 41/042 |
| 2017/0164212 A1* | 6/2017 | Opsenica | H04W 12/06 |
| 2017/0208019 A1* | 7/2017 | Shimojou | H04L 12/4641 |
| 2017/0289791 A1* | 10/2017 | Yoo | H04W 76/11 |
| 2017/0332212 A1* | 11/2017 | Gage | H04W 4/70 |
| 2017/0332421 A1* | 11/2017 | Sternberg | H04W 76/11 |
| 2018/0077637 A1* | 3/2018 | Basilier | H04W 48/18 |
| 2018/0124854 A1* | 5/2018 | Myhre | H04W 4/70 |
| 2018/0241635 A1* | 8/2018 | Rao | H04L 41/14 |

(Continued)

FOREIGN PATENT DOCUMENTS

| | | |
|---|---|---|
| CN | 103118053 A | 5/2013 |
| CN | 106060900 A | 10/2016 |

OTHER PUBLICATIONS

Google: management exposure function, 2019.*

(Continued)

*Primary Examiner* — Alina A Boutah

(57) ABSTRACT

The present application provides a method and system for the operation of a management plane function to co-ordinate management of slice and slice-related resources within a communications network.

24 Claims, 21 Drawing Sheets

(56) References Cited

U.S. PATENT DOCUMENTS

2018/0310238 A1* 10/2018 Opsenica .............. H04W 12/06
2018/0376414 A1* 12/2018 Zeng ....................... H04W 8/02
2019/0109768 A1* 4/2019 Senarath .............. H04W 48/16

OTHER PUBLICATIONS

3GPP TR 22.891, Technical Specification Group Services and System Aspects;Feasibility Study on New Services and Markets Technology Enablers; Stage 1; (Nov. 2015).
International Search Report dated Jan. 22, 2018 for corresponding International Application No. PCT/CN2017/108968 filed Nov. 1, 2017.
ZTE Corporation et al.,"IFA022 Multi-Site Network Slicing Use case", NFVIFA(16)000767R7, Sep. 10, 2016, total 14 pages.
Hewlett Packard Enterprise et al.,"Single Domain Network Slicing use case-Clause 6.2.2", NFVEVE(16)0000154R3, Sep. 5, 2016 ,total 4 pages.
A.Galis et al.,"Autonomic Slice Networking—Requirements and Reference Model draft-galis-anima-autonomic-slice-networking-01", Network Working Group, Oct. 31, 2016, total 18 pages.

\* cited by examiner

| | Slice instantiation | Initial NF configuration of slice | Slice (re)configuration | Slice usage (re)configuration | Slice provisioning (re)configuration |
|---|---|---|---|---|---|
| A | NM | NM | NM | NM | NM |
| B | NM | NM | NM | NM | SOM |
| C | NM | NM | NM | SOM | SOM |
| D | NM | NM | SOM | SOM | SOM |
| E | NM | SOM | SOM | SOM | SOM |
| F | SOM | SOM | SOM | SOM | SOM |

FIG. 5A

| | Logical topology | Slice instantiation | Initial NF configuration of slice | Slice (re)configuration | Slice usage (re)configuration | Slice provisioning (re)configuration |
|---|---|---|---|---|---|---|
| A | NM | NM | NM | NM | NM | NM |
| B | NM | NM | NM | NM | NM | SOM |
| C | NM | NM | NM | NM | SOM | SOM |
| D | NM | NM | NM | SOM | SOM | SOM |
| E | NM | NM | SOM | SOM | SOM | SOM |
| F | NM | SOM | SOM | SOM | SOM | SOM |

FIG. 5B

SYSTEM AND METHOD FOR NETWORK SLICE MANAGEMENT IN A MANAGEMENT PLANE

CROSS REFERENCE TO RELATED APPLICATIONS

This application is related to U.S. Provisional Patent Application Ser. No. 62/416,007, filed Nov. 1, 2016, and entitled SYSTEM AND METHOD FOR NETWORK SLICE MANAGEMENT IN A MANAGEMENT PLANE, and to U.S. Provisional Patent Application Ser. No. 62/435,011, filed Dec. 15, 2016, and entitled SYSTEM AND METHOD FOR NETWORK SLICE MANAGEMENT IN A MANAGEMENT PLANE the contents of both applications are incorporated herein by reference.

FIELD OF THE INVENTION

The present application pertains to the field of communication networks. More particularly, the present application relates to a system and method for network slice management.

BACKGROUND

Communication networks enabled by technologies such as Network Function Virtualization (NFV), Software Defined Networking (SDN), and Software Defined Topology (SDT), may be flexibly organized so as to service various customer demands. In building advanced networks, such as those to support future developments in wireless networks (including next generation wireless, or 5th generation networks), network slicing provides the ability to create isolated virtual networks that can be used to independently manage different traffic flows over a network. However, managing variable and competing demands on a potentially large network scale is a complex proposition requiring an effective architecture and management thereof.

There remains a need for an overall management architecture to instantiate, configure and modify the parameters of existing network slices, without adversely impacting other slices while fully utilizing the resources and capabilities assigned to a given slice.

This background information is provided to reveal information believed by the applicant to be of possible relevance to the present invention. No admission is necessarily intended, nor should be construed, that any of the preceding information constitutes prior art against the present invention.

SUMMARY

The present application provides a system and method for network slice management in a management plane.

In accordance with a first aspect of the present invention, there is provided a slice operations manager (SOM). The SOM comprises a network interface, a processor and a memory. The network interface is configured to receive data from and transmit data to network functions connected to a network. The memory may be a non-transient memory for storing instructions that when executed by the processor configure the SOM, when instantiated by a network manager (NM) managing a plurality of slice instances on the network, to be operative to manage at least one operation of at least one slice instance of the plurality of slice instances independent from the NM, based on SOM parameters provided by the NM.

In an embodiment of the first aspect, the SOM parameters comprise at least a slice logical topology for the at least one slice instance. In another embodiment, the SOM is operative to manage, for the at least one slice instance, at least one of: slice instance and related management plane data; adaptation to configuration and policy changes as prescribed by the NM for the slice instance; configuration management for the r slice instance; releasing unnecessary resources allocated to the slice instance; requesting more resources for the respective slice instance; monitoring slice-specific data processing and performance for the slice instance; keeping track of policy, control, and resource related aspects of individual service instances provided by the slice instance; service instance creation, monitoring, modification, and termination within the slice instance; and fault and performance management of the slice instance. In another embodiment, the non transient memory further stores instructions that when executed configure the SOM to be operative to perform at least one of instantiation of the at least one slice instance, configuration of at least one network function of the at least one slice instance, and termination of the at least one slice instance. In another embodiment, the non-transient memory stores further instructions that when executed configure the SOM to be operative to receive, from the NM configuration instructions for the at least one slice instance; and configure the at least one slice instance based on the received configuration instructions. In a further embodiment, the non-transient memory stores further instructions that when executed configure the SOM to be operative to identify a need to reconfigure the at least one slice instance to meet service requirements; and reconfigure the at least one slice instance based on the allocation of resources. In another embodiment, the non-transient memory stores further instructions that when executed configure the SOM to be operative to transmit, to the NM, a request for additional resources; receive, from the NM, an allocation of resources; and, reconfigure the at least one slice instance based on the allocation of resources. In another embodiment the non-transient memory stores further instructions that when executed configure the SOM to be operative to receive, from a third party, instructions for the at least one slice instance; and, configure the at least one slice instance based on the received configuration instructions. Optionally, the instruction received from a third party is received through a management exposure function (MEF), and the third party may in a further optional embodiment, not be in direct communication with the NM. In another optional embodiment, the MEF is not in communication with the NM.

In another embodiment, the non-transient memory stores further instructions that when executed configure the SOM to be operative to monitor slice usage of the at least one slice instance; determine, based on the SOM parameters and the slice usage, that additional resources are required to meet service requirements of the at least one slice instance; and reconfigure the at least one slice instance based on the allocation of resources. In another embodiment, the non-transient memory stores further instructions that when executed configure the SOM to be operative to further perform one or more operations including initial configuration of the at least one slice instance; configuration of the at least one slice instance; reconfiguration of the at least one slice instance; monitoring slice usage of the at least one slice instance; reconfiguring the at least one slice instance based on slice usage; slice provisioning configuration of the at least one slice instance; and, slice provisioning reconfiguration of the at least one slice instance. In a further embodiment, the non-transient memory stores further instructions that when executed configure the SOM to be operative to perform a different one or more operations, based on an identity of the at least one slice instance. In another embodiment, the non-transient memory stores further instructions that when executed configure the SOM to be operative to communicate with at least one other SOM managing a different slice instance, and wherein the SOM is operative to temporarily release to the at least one other SOM network resources allocated to the at least one slice instance. In another embodiment, the non-transient memory stores further instructions that when executed configure the SOM to be operative to communicate with at least one other SOM managing a different slice instance, and wherein the SOM is operative to temporarily expand network resources available to the at least one slice instance by accepting from the at least one other SOM other network resources allocated to the different slice instance.

In a second aspect of the present invention, there is provided a method that can be executed by a slice operations manager (SOM) instantiated by a network manager (NM) operative to manage a plurality of slice instances on the network. The method comprises managing at least one operation of at least one slice instance independent from, the remaining plurality of slice instances, based on SOM parameters provided by the NM.

In an embodiment of the second aspect, the SOM parameters comprise at least a slice logical topology for the at least one slice instance. In another embodiment, the SOM is operative to manage, for the at least one slice instance, at least one of: slice instance and related management plane data; adaptation to configuration and policy changes as prescribed by the NM for the slice instance; configuration management for the r slice instance; releasing unnecessary resources allocated to the slice instance; requesting more resources for the respective slice instance; monitoring slice-specific data processing and performance for the slice instance; keeping track of policy, control, and resource related aspects of individual service instances provided by the slice instance; service instance creation, monitoring, modification, and termination within the slice instance; and, fault and performance management of the slice instance. In another embodiment, the method may include at least one of instantiating the at least one slice instance; configuring at least one network function of the at least one slice instance and terminating the at least one slice instance. In a further embodiment, the method may include receiving, from the NM configuration instructions for the at least one slice instance; and, configuring the at least one slice instance based on the received configuration instructions. In a further embodiment, the method may comprise identifying a need to reconfigure the at least one slice instance to meet service requirements; and, reconfiguring the at least one slice instance based on the allocation of resources. In another embodiment, the method may comprise transmitting, to the NM, a request for additional resources; receiving, from the NM, an allocation of resources; and, reconfiguring the at least one slice instance based on the allocation of resources.

In another embodiment, the method may comprise receiving, from a third party, instructions for the at least one slice instance; and, configuring the at least one slice instance based on the received configuration instructions. Optionally, the instruction is received from a management exposure function (MEF). In some further embodiment, the third party is not in communication with the NM, while in other embodiments, the MEF is not in communication with the NM.

In another embodiment, the method further comprises monitoring slice usage of the at least one slice instance; determining, based on the SOM parameters and the slice usage, that additional resources are required to meet service requirements of the at least one slice instance; and reconfiguring the at least one slice instance based on the allocation of resources. In another embodiment, the method further comprises the SOM performing at least one of initial configuration of the at least one slice instance; configuration of the at least one slice instance; reconfiguration of the at least one slice instance; monitoring slice usage of the at least one slice instance; reconfiguring the at least one slice instance based on slice usage; slice provisioning configuration of the at least one slice instance; and slice provisioning reconfiguration of the at least one slice instance.

In a further embodiment, the method comprises the SOM performing at least one operation based on an identity of the at least one slice instance. In a further embodiment, the method comprises comprising the SOM: communicating with at least one other SOM managing a different slice instance, and temporarily releasing to the at least one other SOM network resources allocated to the at least one slice instance. In another embodiment, the method comprises communicating with at least one other SOM managing a different slice instance, and temporarily expanding network resources available to the at least one slice instance by accepting from the at least one other SOM other network resources allocated to the different slice instance.

BRIEF DESCRIPTION OF THE FIGURES

Further features and advantages of the present invention will become apparent from the following detailed description, taken in combination with the appended drawing, in which:

FIGS. 5A & 5B are tables summarizing some embodiments of available combinations of slice creation, configuration, and re-design functions that may be controlled by a slice operations manager;

DETAILED DESCRIPTION

Various acronyms as used herein are defined in the following non-exhaustive list:
AN: Access Network
BSS: Business Support Systems
CM: Configuration Management
CN: Core Network
CP: Control Plane
DC: Data Centre
DM: Domain Manager
EM: Element Manager
EMS: Element Manager Subsystem
FM: Fault Management
MANO: Management and Orchestration
MP: Management Plane
NE: Network Entity
NM: Network Manager
NS: Network Slice
NSLD: Network SLice Descriptor
OSS: Operations Support System
PM: Performance Management
PNF: Physical Network Function
QoE: Quality of Experience
QoS: Quality of Service
RAN: Radio access network
SLA: Service Level Agreement
SDRA: Software Defined Resource Allocation
SOM: Slice Operations Manager
S-Opt: Slice Operations
SP: Service Provider
TE: Traffic Engineering
UE: User Equipment
UP: User Plane
VN: Virtual Network
VNF: Virtual Network Function Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or ingredient(s) as appropriate.

Figure 1:
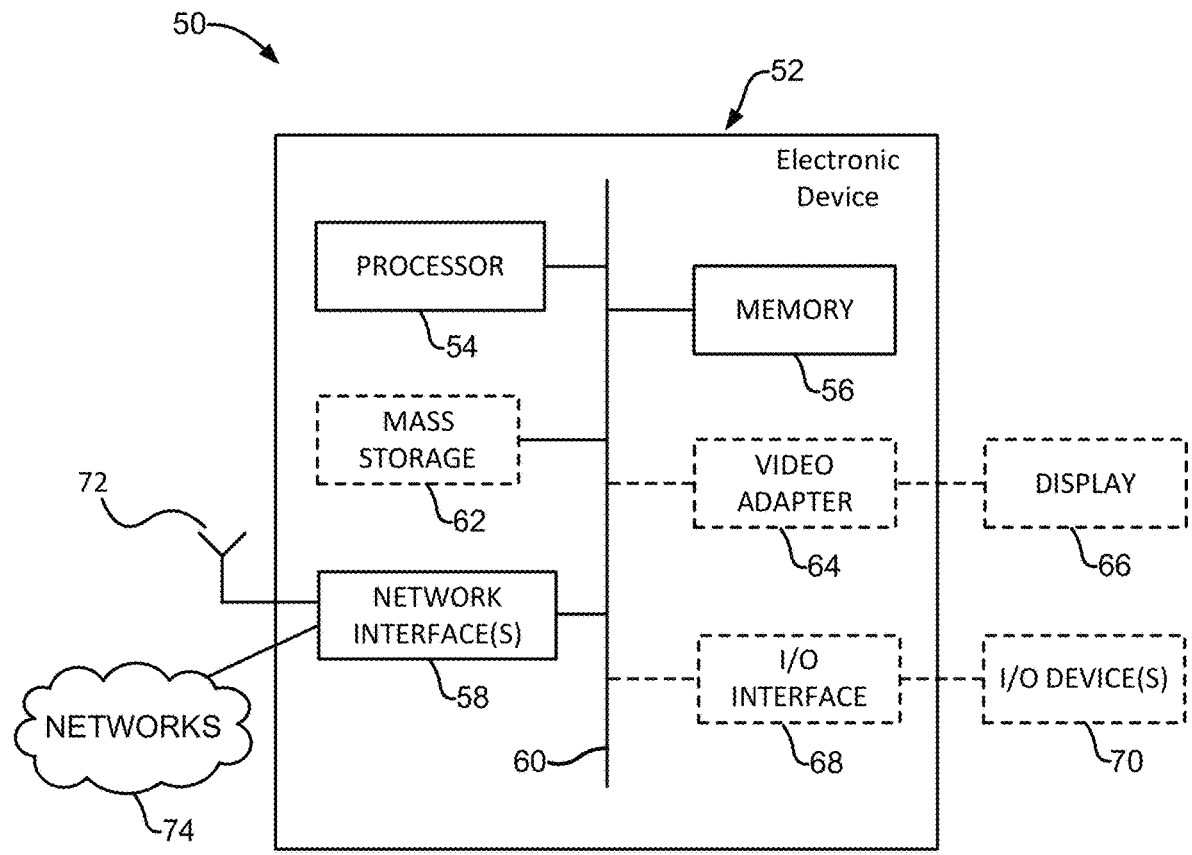
FIG. 1 is a block diagram of an electronic device within a computing and communications environment that may be used for implementing devices and methods in accordance with representative embodiments of the present invention.

FIG. 1 is a block diagram of an electronic device (ED) 52 illustrated within a computing and communications environment 50 that may be used for implementing the devices and methods disclosed herein. In some embodiments, the electronic device may be an element of communications network infrastructure, such as a base station (for example a NodeB, an enhanced Node B (eNodeB), a next generation NodeB (sometimes referred to as a gNodeB or gNB), a home subscriber server (HSS), a gateway (GW) such as a packet gateway (PGW) or a serving gateway (SGW) or various other nodes or functions within an evolved packet core (EPC) network. In other embodiments, the electronic device may be a device that connects to network infrastructure over a radio interface, such as a mobile phone, smart phone or other such device that may be classified as a User Equipment (UE). In some embodiments, ED 52 may be a Machine Type Communications (MTC) device (also referred to as a machine-to-machine (m2m) device), or another such device that may be categorized as a UE despite not providing a direct service to a user. In some references, an ED may also be referred to as a mobile device, a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 52 typically includes a processor 54, such as a Central Processing Unit (CPU), and may further include specialized processors such as a Graphics Processing Unit (GPU) or other such processor, a memory 56, a network interface 58 and a bus 60 to connect the components of ED 52. ED 52 may optionally also include components such as a mass storage device 62, a video adapter 64, and an I/O interface 68 (shown in dashed lines).

The memory 56 may comprise any type of non-transitory system memory, readable by the processor 54, such as static random access memory (SRAM), dynamic random access memory (DRAM), synchronous DRAM (SDRAM), read-only memory (ROM), or a combination thereof. In an embodiment, the memory 56 may include more than one type of memory, such as ROM for use at boot-up, and DRAM for program and data storage for use while executing programs. The bus 60 may be one or more of any type of several bus architectures including a memory bus or memory controller, a peripheral bus, or a video bus.

The electronic device 52 may also include one or more network interfaces 58, which may include at least one of a wired network interface and a wireless network interface. As illustrated in FIG. 1, network interface 58 may include a wired network interface to connect to a network 74, and also may include a radio access network interface 72 for connecting to other devices over a radio link. When ED 52 is network infrastructure, the radio access network interface 72 may be omitted for nodes or functions acting as elements of the Core Network (CN) other than those at the radio edge (e.g. an eNB). When ED 52 is infrastructure at the radio edge of a network, both wired and wireless network interfaces may be included. When ED 52 is a wirelessly connected device, such as a User Equipment, radio access network interface 72 may be present and it may be supplemented by other wireless interfaces such as WiFi network interfaces. The network interfaces 58 allow the electronic device 52 to communicate with remote entities such as those connected to network 74.

The mass storage 62 may comprise any type of non-transitory storage device configured to store data, programs, and other information and to make the data, programs, and other information accessible via the bus 60. The mass storage 62 may comprise, for example, one or more of a solid state drive, hard disk drive, a magnetic disk drive, or an optical disk drive. In some embodiments, mass storage 62 may be remote to the electronic device 52 and accessible through use of a network interface such as interface 58. In the illustrated embodiment, mass storage 62 is distinct from memory 56 where it is included, and may generally perform storage tasks compatible with higher latency, but may generally provide lesser or no volatility. In some embodiments, mass storage 62 may be integrated with a heterogeneous memory 56.

The optional video adapter 64 and the I/O interface 68 (shown in dashed lines) provide interfaces to couple the electronic device 52 to external input and output devices. Examples of input and output devices include a display 66 coupled to the video adapter 64 and an I/O device 70 such as a touch-screen coupled to the I/O interface 68. Other devices may be coupled to the electronic device 52, and additional or fewer interfaces may be utilized. For example, a serial interface such as Universal Serial Bus (USB) (not shown) may be used to provide an interface for an external device. Those skilled in the art will appreciate that in embodiments in which ED 52 is part of a data center, I/O interface 68 and Video Adapter 64 may be virtualized and provided through network interface 58.

In some embodiments, electronic device 52 may be a standalone device, while in other embodiments electronic device 52 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

As used herein, a "network" or "communication network" may serve various devices including but not necessarily limited to wireless devices. Such a network may include a radio access portion, a backhaul portion and a core network portion. The network may further comprise various virtualized components as will become readily apparent herein. While networks compliant with the Long Term Evolution (LTE) network standards, and those complying with the requirements of the Evolved Packet Core (EPC) can be implemented using network slicing, their fundamental design does not take advantage of, nor does it provide control for, network slicing and the use of virtualized functions. Discussions for the standardization of future mobile network design and architecture, including a so-called Fifth Generation (5G) networks have been started. New network architectures and functional elements are being discussed to take advantage of techniques such as network slicing, network function virtualization, as well as software defined networking, topology and protocols. The use of these different technologies allows for the creation of flexible networks that will allows for a core network employed by 5G networks to be built with various network technologies that allow for reconfigurability to suit various different needs.

Figure 2:
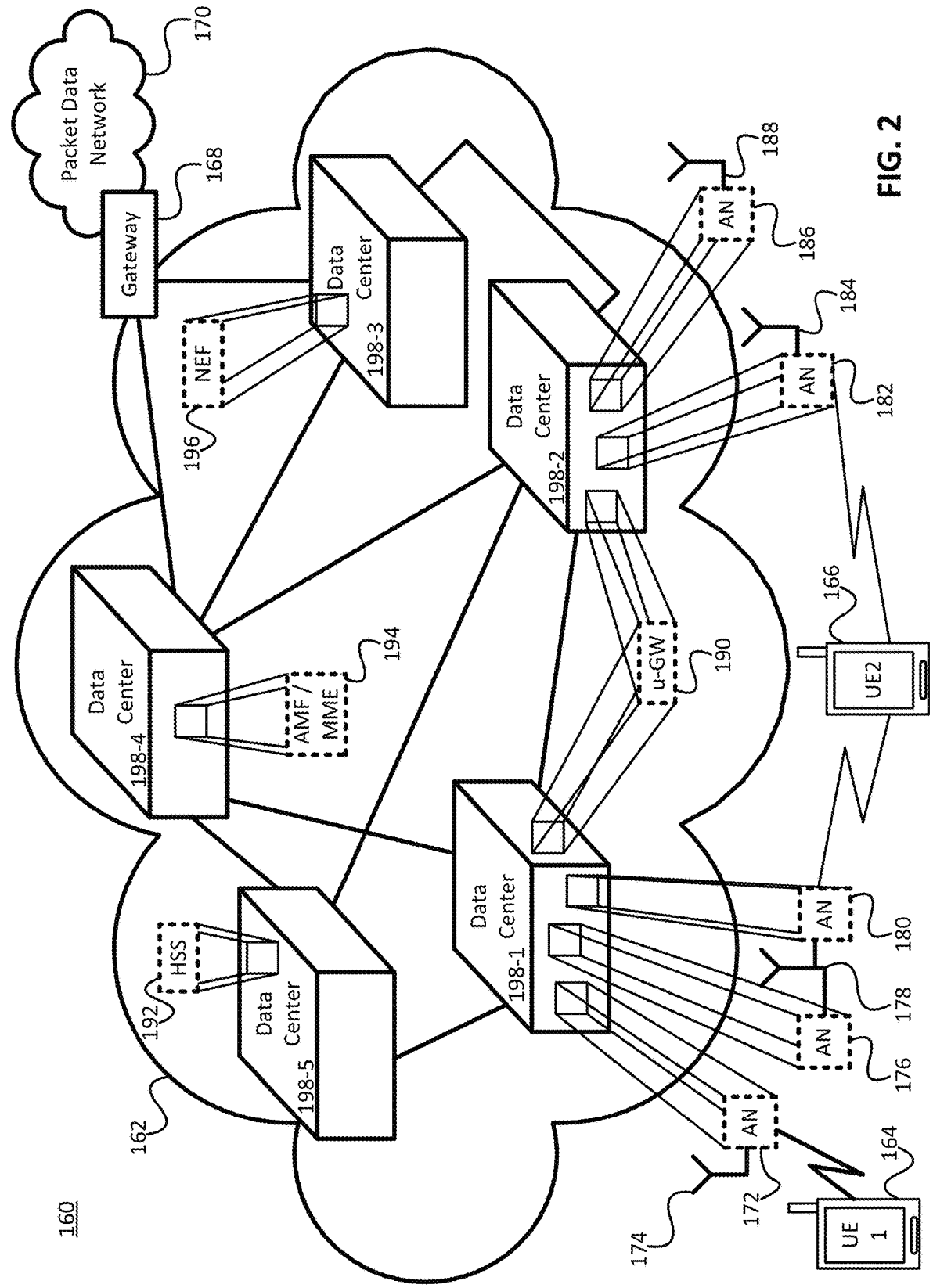
FIG. 2 is a diagram illustrating a cloud-based implementation of a Core Network and Radio Access Network using virtualized functions.

FIG. 2 illustrates a system 160 in which a core/RAN network 162 provides radio access and core network services to electronic devices such as UE1 164 and UE2 166. In this figure, network functions are instantiated upon the underlying resources of a data center. The functions are shown as being exploded out of the pool of resources upon which they are instantiated. This is done to indicate that the functions act as independent entities and from a logical perspective they are indistinguishable from a physical node carrying out the same function. It should also be understood that in a sliced network where data centers provide the underlying resources upon which the slices are created, it is possible for a single network to have slices that support different versions of networks, so for example, in addition to having a virtualized network to support 5G traffic, a separate network slice can be created to support 4G networks. Traffic from electronic devices can be routed through network functions, to a gateway 168 that provides access to a packet data network 170 such as the Internet. Radio access services are typically provided by a RAN, which in this illustration is provided as a Cloud-RAN (C-RAN). Where a conventional RAN architecture was designed to be composed of discrete elements, such as eNodeBs, that were connected to the Core Network through a backhaul network, a C-RAN takes advantage of function virtualization to virtualize the Access Nodes of the network. Much as a physical Access Node, such as an eNodeB, was connected to an antenna by a front haul link, in the illustrated embodiment of a C-RAN Access Nodes, such as a gNodeB, are connected to antenna (or to a remote radio head (RRH)) through a front haul connection, but are functions that are instantiated upon compute resources in network 162. If a gNodeB is divided into a Central Unit and a plurality of Distributed Units, the virtualized Distributed Units may in some embodiments be instantiated at or near the location of the antenna or RRH, while a Centralized Unit may be instantiated at a data center to connect and serve a plurality of geographically dispersed Distributed Units. For example, UE1 164 is connected to the network through AN 172, which can provide radio access services through antenna 174. AN 172 is instantiated upon the compute and storage resources provided by a data center, in this case data center 198-1. Similarly, AN 176 and AN 180, which are connected to the same set of antennae 178, are also instantiated upon the resources of data center 198-1. AN 180 provides radio access services to UE 2 166, which also makes use of the access services provided by AN 182. AN 182 is connected to antenna 184, and is instantiated upon the resources of data center 198-2. AN 186 is connected to antenna 188, and is also instantiated upon the resources of data center 198-2. It should be understood that the fronthaul connections linking the virtualized access nodes to the antennas or RRHs, may be direct connections, or they may form a fronthaul network. The integration of a CRAN into a core network may obviate or reduce the concerns associated with backhaul connections as the AN functions may be co-located with CN functions. As such, Data Center 198-1 also serves as a location at which a user-specific gateway function (u-GW) 190 is instantiated. This function is also instantiated in data center 198-2. Having a function instantiated at more than one data center may be part of a function migration process in which the function is moved through the network, or one of the instantiations may be an intentionally redundant instantiation. Both functions can be instantiated and configured, with only one of them active at a time, or they may both be active, but only one of them may be transmitting data to the UE. In other embodiments, such as those focussed on Ultra-Reliable connections, such as Ultra-Reliable Low Latency Communications (URLLC), both functions may be active and transmitting data to (or receiving data from) an ED such as UE2 166. Network functions such as a Home Subscriber Server (HSS) 192, an Access and Mobility Management Function (AMF) 194 or its predecessor Mobility Management Entity (MME), and a Network Exposure Function (NEF) 196 are shown as being instantiated on the resources of Data Center 198-5, 198-4 and 198-3 respectively.

The virtualization of the network functions allows a function to be located in the network at a location topologically close to the demand for the service provided by the function. Thus, AN 172, which is associated with antenna 174, can be instantiated upon data center resources at the data center closest to the antenna 174, in this case data center 198-1. Functions such as an NEF 196, which may not need to be close to ANs, may be instantiated further away (in either or both of a topological or physical sense). Thus, NEF 196 is instantiated at data center 198-3, and the HSS 192 and AMF 194 are instantiated at data centers 198-5 and 198-4 respectively, which are topologically closer to the radio edge of the network 162. In some network implementations, data centers can be arranged hierarchically and different functions can be placed at different levels in the hierarchy.

Network slicing can be supported so that network slices can be created on underlying network resources. From within a slice, the slice will appear to be its own unique network, and it can serve as a set of underlying resources for any number of virtual networks. The resources of a slice can also be further sliced to create subslices. Network slicing allows the resources of a slice to be dedicated in a manner that ensure that two different slices relying upon the same underlying resources will not impact each other. These technologies can also allow the network to support network slicing to create isolated sub-networks with characteristics suited for the needs of the traffic that they are designed to support. The network may include a number of computing hardware resources that provide processing, memory, and storage resources to functions within the network. Connectivity between nodes within a network hosted within a slice, can be created using logical links. As a result, the topology of the network, and the services and functions offered within the network can be varied to provide different network connectivity options connecting the computing resources to each other, and making it possible to provide service to mobile devices.

Figure 3A:
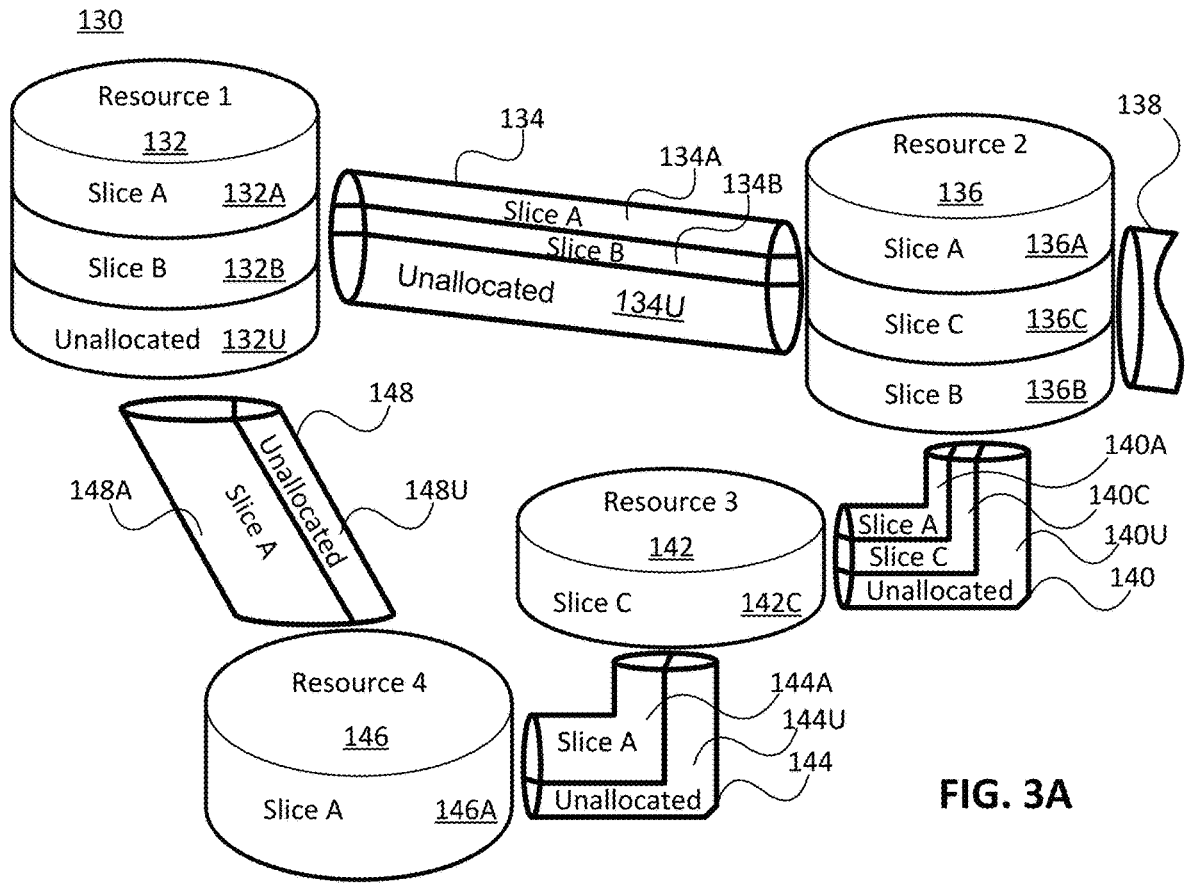
FIG. 3A is a block diagram schematically illustrating an architecture in which network slicing can be implemented.

FIG. 3A illustrates an architecture 130 that connects a plurality of connectivity, compute and storage resources, and supports network slicing. In the following, resources are connected to other discrete resources through Connectivity Resources 134 138, 140, 144 and 148. It will be understood that as network functions are instantiated within resources, they may be connected to each other by virtual connections that in some embodiments do not rely upon the physical connectivity resources illustrated, but instead may be connected to each other by virtual connections, which will also be considered as connectivity resources. Resource 1 132 is connected to Resource 2 136 by Connectivity Resource 134. Resource 2 136 is connected to unillustrated resources through Connectivity Resource 138, and is also connected to Resource 3 142 by Connectivity Resource 140. Resource 4 146 is connected to Resource 3 142 through Connectivity Resource 144, and to Resource 1 132 by Connectivity Resource 148. Resource 1 132, Resource 2 136, Resource 3 142 and Resource 4 146 should be understood as representing both compute and storage resources, although specialized functions may also be included. In some embodiments a specialized network function may be represented by any or all of Resource 1 132, Resource 2 136, Resource 3 142 and Resource 4 146, in which case, it may be the capability or capacity of the network function that is being sliced. Connectivity Resources 134, 138, 140, 144 and 148 may be considered, for the following discussions, as logical links between two points (e.g. between two data centers) and may be based on set of physical connections.

Resource 1 132 is partitioned to allocate resources to Slice A 132A, and Slice B 132B. A portion 132U of the resources available to Resource 1 132 remains unallocated. Those skilled in the art will appreciate that upon allocation of the network resources to different slices, the allocated resources are isolated from each other. This isolation, both in the compute and storage resources, ensures that processes in one slice do not interact or interfere with the processes and functions of the other slices. This isolation can be extended to the connectivity resources as well. Connectivity Resource 134 is partitioned to provide connectivity to Slice A 134A and Slice B 134B, and also retains some unallocated bandwidth 134U. It should be understood that in any resource that either has unallocated resources or that has been partitioned to support a plurality of resources, the amount of the resource (e.g. the allocated bandwidth, memory, or number of processor cycles) can be varied or adjusted to allow changes to the capacity of each slice. In some embodiments, slices are able to support "breathing", which allows the resources allocated to the slice to increase and decrease along with any of the available resources, the required resources, an anticipated resource need, or other such factors, alone or in combination with each other. In some embodiments the allocation of resources may be in the form of soft slices in which a fixed allocation is not committed and instead the amount of the resource provided may be flexible. In some embodiments, a soft allocation may allocate a percentage the resource to be provided over a given time window, for example 50% of the bandwidth of a connection over a time window. This may be accompanied by a minimum guaranteed allocation. Receiving a guarantee of 50% of the capacity of a connectivity resource at all times may provide very different service characteristics than receiving 50% of the capacity of the connectivity resource over a ten second window.

Resource 2 136 is partitioned to support allocations of the available compute and storage resources to Slice A 136A, Slice C 136C and Slice B 136B. Because there is no allocation of resources in connectivity resource 134 to Slice C, Resource 2 136 may, in some embodiments, not provide a network interface to Slice C 136C to interact with connectivity resource 134. Resource 2 136 can provide an interface to different slices to Connectivity Resource 138 in accordance with the slices supported by Connectivity Resource 138. Connectivity Resource 140 is allocated to Slice A 140A and Slice C 140C with some unallocated capacity 140U. Connectivity Resource 140 connects Resource 2 136 with Resource 3 142.

Resource 3 142 provides compute and storage resources that are allocated exclusively to Slice C 142C, and is also connected to Connectivity Resource 144 which in addition to the unallocated portion 144U includes an allocation of Connectivity Resource 144A to slice A. It should be noted that from the perspective of functions or processes within Slice A, Resource 3 142 may not be visible. Connectivity Resource 144 provides a connection between Resource 3 142 and Resource 4 146, whose resources are allocated entirely to Slice A 146A. Resource 4 146 is connected to Resource 1 132 by Connectivity Resource 148, which has a portion of the connection allocated to Slice A 148A, while the balance of the resources 148U are unallocated.

Figure 3B:
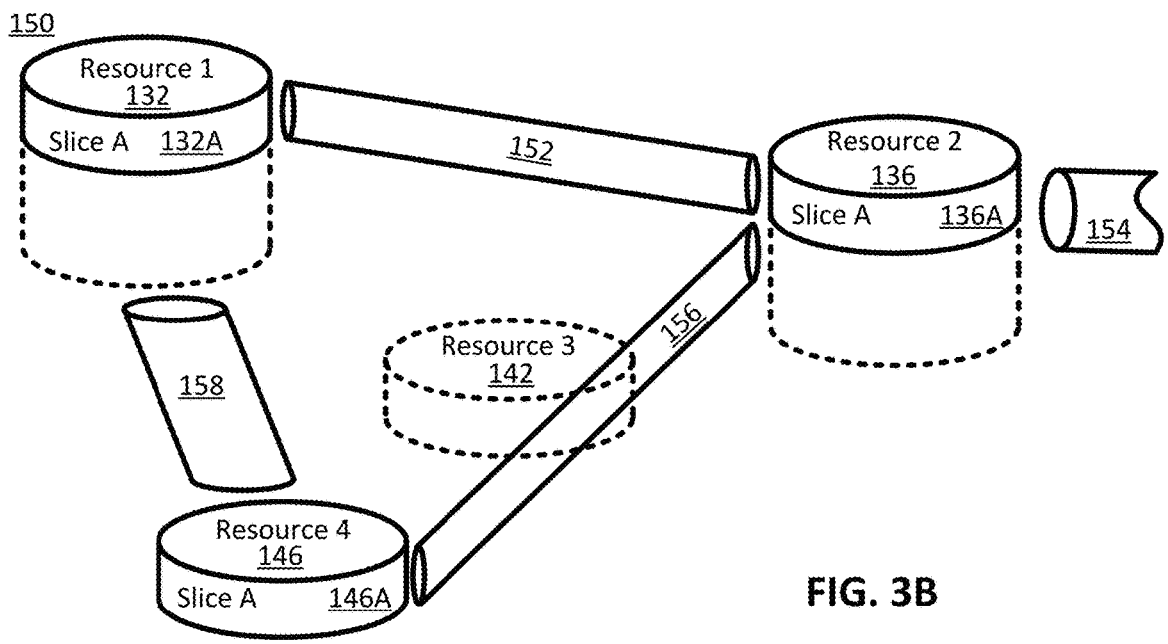
FIG. 3B is a block diagram illustrating the architecture discussed in FIG. 3A from the perspective of a single slice.
Figure 4:
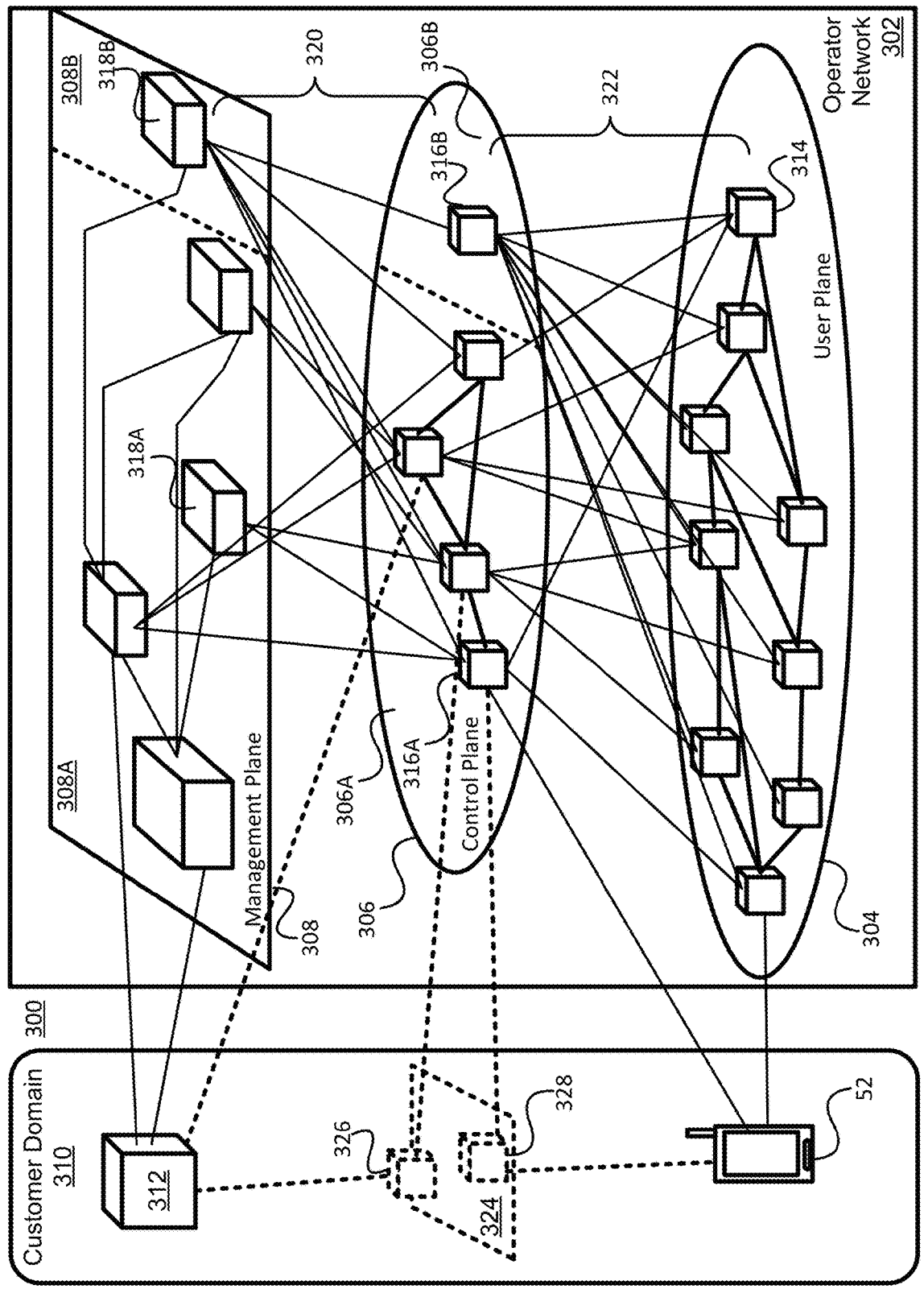
FIG. 4 is a diagram illustrating an embodiment of interactions between the Management Plane, Control Plane and User Plane of a network.

FIG. 3B illustrates the view of the architecture 136 of FIG. 3A as would be seen from the perspective of Slice A. This may be understood as a view of the resources allocated to Slice A 150 across the illustrated network segment. From within Slice A 150, only the portions of the resources that have been allocated to Slice A 150 are visible. Thus, instead of being able to see the full capacity and capability of Resource 1 132, the capabilities and capacity of the portion allocated to Slice A 132A is available. Similarly, instead of being able to see the capacity and capabilities of Resource 2 136, only the capabilities and capacity of the portion allocated to Slice A 136A are available. Because nothing from Resource 3 142 had been allocated to Slice A 150, Resource 3 142 is not present within the topology of Slice A 150. All of the capacity and capability of Resource 4 146 was allocated to Slice A 146, and as such is present within Slice A 150. Slice A 132A of Resource 1 132 is connected to Slice A 136A of Resource 2 136 by logical link 152. Logical Link 152 may correspond to the portion of connectivity resource 134 allocated to Slice A 134A. Slice A 136A is connected to logical link 154 (representative of the portion of connectivity resource 138 allocated to Slice A 150), and is connected to Slice A 146A by logical link 156. Logical link 156 is representative of the portions of connectivity resource 140 and connectivity resource 144 that have been allocated to Slice A (portions 140A and 144A respectively). It should be understood that due to the absence of Resource 3 142 from Slice A 150, any traffic transmitted by Slice A 136A onto Connectivity Resource 140A will be delivered to Resource 4 146, and similarly any traffic transmitted from Slice 146A into Connectivity Resource 144A will be delivered to Slice A 136A. As such, within Slice A 150, Connectivity Resources 140A and 144A can be modelled as a single logical link 156. Logical link 158 is representative of the portion of Connectivity Resource 148 allocated to slice A 148A.

It should be understood that within the storage and compute resources illustrated in FIGS. 3A & 3B, network functions can be instantiated using any of a number of known techniques, including network function virtualization (NFV), to create Virtual Network Functions (VNFs). While conventional telecommunications networks, including so-called Third Generation and Fourth Generation (3G/4G) networks, can be implemented using virtualized functions in their core networks, next generation networks, including so-called Fifth Generation (5G) networks, are expected to use NFV and other related technologies as fundamental building blocks in the design of a new Core Network (CN) and Radio Access Network (RAN). By using NFV, and technologies such as Software Defined Networking (SDN), functions in a CN can be instantiated at a location in the network that is determined based on the needs of the network. It should be understood that if a network slice is created, the allocation of resources at different data centers allows for the instantiation of a function at or near a particular geographic location, even within the slice where resources have been abstracted. This allows virtualized functions to be "close" in a physical sense to the location at which they are used. This may be useful, and may be combined with a sense of topological closeness to select a logical location at which to instantiate a function so that it is geographically or topologically close to a selected physical or network location.

The term "mobile device" should be understood to refer to a device that connects to a mobile network, and should not be understood as requiring that the device itself be mobile. Mobile networks are those that make use of wireless communication channels to enable connected to devices to be connected to the network while supporting mobility. One example of a mobile device is the User Equipment (UE) as defined by the Third Generation Partnership Project (3GPP), which may include both handsets and other devices, including Machine-to-Machine (m2m) devices (also referred to as Machine Type Communications (MTC) devices).

Network slicing refers to a technique for creating isolated network segments atop an underlying pool of network resources. These isolated segments are typically referred to as network slices, and can serve as the underlying resource upon which network functions can be instantiated and configured for use in a virtual network. Traffic and processing demands within one network slice do not have an impact on other network slices. In combination with network function virtualization (NFV), and the ability to define logical links between functions within a slice, network slicing allows for the creation of isolated network slices that can host a plurality of virtual networks each of which is used to carry different types of network traffic, and which can be used in reconfigurable network architectures. A network slice (as defined in 3GPP TR 22.891 entitled "Study on New Services and Markets Technology Enablers," Release 14, Version 1.2.0, Jan. 20, 2016) is composed of a collection of logical network functions that supports communication service requirements of particular use cases. One use of network slicing is within the core network of a mobile communications network architecture. Through the use of network slicing, a plurality of network slices can be created, and different types of network traffic can be placed in distinct virtual networks running on the same physical set of computing resources. It should be understood that network slices can host one or more than one virtual networks.

Demands for resources within a single slice will not impact on the availability of the resourced in other slices, even when the slices rely upon a single pool of underlying resources. Each slice, or each VN within a slice, can be designed the meet the specific needs of the traffic that it carries. This can allow a single network operator to support different services or even different service providers. It should be understood that although this discussion has focussed on the application of network slicing to a core network, it is not intended to exclude the application of network slicing as it applies to the radio access edge of the Radio Access Network (RAN). The isolated nature of network slices allows for performance guarantees, as demands on the resources allocated to a first slice will not be seen within a second slice. The isolation is not restricted to different types of services. A network operator can create different network slices to accommodate different services, or the operator can create a single slice to accommodate a number of services that have similar traffic profiles and requirements. By allowing further differentiation of traffic within a slice, such as by the use of virtual networks and service identifiers, it is possible to have fewer slices than the number of services supported.

Network slicing allows the instantiation of separate network slices respectively directed toward different network services. This allows for separation of different types of traffic which may have different packet processing requirements and QoS requirements. The pooled resources may be commercial-off-the-shelf hardware components capable of configuration through virtualization approaches, such as NFV, in order to support various network functionalities for supporting the operations of the network slices.

The capabilities and operating parameters of each network slice may be customized to the service requirements. Configuration of the network slices may include instantiation of a plurality of virtualized network functions, using network function virtualization techniques, on compute resources from data centers; and defining logical links between the VNFs. These configuration operations may make use of SDN and SDT techniques and controllers as well as MANO functions.

A portion of communication network resources may be allocated for use by a network slice. These resources can include radio access communication resources, node-to-node communication resources, computational resources, and memory resources. Resources may further include network infrastructure resources such as management plane resources, control plane resources, and data plane resources. Resources may include hardware resources, such as portions of computer processing capabilities, or communication resources, such as portions of communication links partitioned by time, frequency, spreading code, or a combination thereof. Nodes in the same network slice may be connected by logical connections, which can be thought of as overlaying physical connections.

Each Mobile Network Operator (MNO) may create a customised set of network slices using physical and/or virtualised network functions to meet their business and service needs. In some instances, a network slice may be pre-configured; in other instances, a network slice may be dynamically commissioned or re-configured to meet dynamically changing traffic demands.

The present application provides a system and method for network slice management that addresses a need for an overall management architecture to instantiate, configure and modify the parameters of existing network slices, without adversely impacting other slices while fully utilizing the resources and capabilities assigned to a given slice. The presently provided hierarchical management system and method functions to identify the slice specific needs and co-ordinate, or share, the needs of the overall system.

The presently disclosed hierarchical network management system can, in some embodiments, be implemented as a centralized network management system for handling inter-slice management issues. The system can include at least one virtualized slice operations to handle slice specific issues. There may also be a slice operations manager for each slice instance, however it should be noted that in other embodiments a single slice operations manager can manage a plurality of slice instances. The slice operations manager can be instantiated or assigned upon slice creation. Those skilled in the art will appreciate that where a physical slice operations manager exists and a portion of the resources of such a slice operations manager is allocated to a slice, the physical slice operations manager may require, instead of instantiation, some degree of initialization or configuration.

Those skilled in the art will appreciate that the slice operations manager may be referred to as an S-Opt Manager, s-opt-mgmt or SOM. Furthermore, it should be understood that the virtualized slice operations manager may be either an entity created using general purpose resources within a network slice, or it may be a virtualized representation of a dedicated SOM that has a portion of its resources allocated to the slice.

The slice operations manager provides independent management of at least one of the following:
 slice instances and related management plane data;
 adaptation to configuration and policy changes as prescribed by a network manager (NM) for the given slice instance(s);
 configuration management for the respective slice instance(s)
 releasing unnecessary resources allocated to the respective slice instance(s);
 requesting more resources from the management system for the respective slice instance(s);
 monitoring slice-specific data processing and performance for the slice instance(s);
 keeping track of policy, control and resource related aspects of individual service instances provided by the network slice;
 service instance creation, monitoring, modification, and termination within the slice instance(s); and
 fault and performance management of the slice instance(s).

In an implementation, the present application provides a system and method for network slice management that addresses the need for authenticating and validating third party slice management operations being conducted on a network slice. In an implementation, the present application provides for a management exposure function (MEF) which provides a management exposure interface that is available to receive third party requests (i.e. requests from entities external to, and lacking interconnection with, slice operations management) for discovery of slice management information or exposure of slice management functionality. In an aspect, the MEF may provide access to information and functionality to allow the third party to manage selected management operations of the slice. In an aspect, the MEF may further authenticate and validate the third party request, and act as an external gateway to the slice management operations. In an aspect, the MEF may provide for authentication and authorization of an external party seeking access to the selected management operations.

In an aspect, the MEF further provides for resource scaling, to allow for slice-specific resource scaling that, optionally, may be controlled directly by the customer accessing the slice. Accordingly, network resources allocated to support a service on a slice may be scaled back, or increased, depending upon specific service requirements. In some aspects, management control may include termination of a service, or slice, through the MEF.

In prior art systems slice creation, configuration, and re-design functions are typically controlled by a network manager (NM) responsible for managing the virtual network and all slices maintained on the virtual network.

FIG. 5A is a table summarizing some embodiments of available combinations of slice creation, configuration, and re-design functions that may be controlled by a slice operations manager (SOM). As illustrated, combinations range from having the NM execute all of the operations, to handing off some or all of the operations to the slice operations manager (SOM).

FIG. 5B is a table, similar to FIG. 5A, that includes an additional column for the logical topology, which, in this embodiment, is always executed/controlled by the NM.

It should be understood that in some embodiments, a network operator may provide different levels of configurability or exposure (corresponding to different options such as those illustrated in FIGS. 5A and 5B) on a slice by slice, or customer by customer, basis. Thus, a slice that is instantiated for a single customer may have a greater number of management parameters exposed to the customer than a slice that is shared amongst a number of different customers. The degree of management exposure may also vary with a price that the customer is willing to pay.

The combinations of FIGS. 5A and 5B include operations that follow after slice design by the NM has been completed. After receiving a request to instantiate a slice, the NM may perform network slice design operations to setup and instantiate the required network functions, define the logical and physical paths for connectivity (if applicable as per the request), allocate required network resources, end-to-end service capabilities and performance guarantees (these include network key performance indicators (KPIs) and individual session KPIs), exposure levels related to management plane, control plane and user plane functions, controlling methods, instantiation work flows, usage and access methods when exposing controlling or information, capacities of the physical and logical links, resources, etc. for the slice.

In some embodiments, the NM may receive a request to instantiate a network slice. The NM may perform network slice design operations, but delegate responsibility for instantiating the slice instance to the SOM by providing SOM with a slice design description which may include the logical and physical paths for connectivity (if applicable as per the request), required network resources, end-to-end service capabilities and performance guarantees (these include network key performance indicators (KPIs) and individual session KPIs), exposure levels related to management plane, control plane and user plane functions, controlling methods, instantiation work flows, usage and access methods when exposing controlling or information, capacities of the physical and logical links, resources, etc. for the slice. In some embodiments the slice design description provided to the SOM may be a complete description. In other embodiments an incomplete description may be provided. When provided with an incomplete description, the SOM may take any of a number of different paths to complete the description including the use of default values.

Thus, while the NM defines the logical topology of the slice instance, the full life cycle of the slice instance: instantiating, configuring, reconfiguring, and terminating, may be left to the SOM at least partially based on the SOM parameters set by the NM.

While FIGS. 5A and 5B indicate increasing delegation to the SOM in each subsequent row, this is for explanatory purposes only. Different combinations of delegated slice management operations are contemplated. For instance, the NM may delegate to the SOM slice reconfiguration and slice usage reconfiguration, but not the slice provisioning reconfiguration. All combinations are contemplated by the invention.

In addition to slice creation, the NM may be relied upon to perform slice re-design operations (also known as slice modification or slice reconfiguration). A slice may be re-designed, for instance, when the NM needs to change the composition of the slice (for example due to a 3rd party request to change the slice parameters, or if a second virtual network to accommodate a second customer is to be created within the slice). A reconfiguration may be a small change, such as a configuration parameter change (e.g. link capacity allocated to a slice is changed), or it can be a larger change requiring the instantiation of a NF. In the case of parameter change, it can be done by re-configuration of the NFs.

Slice instantiation can include:
(1) instantiation of the VNFs at selected DC after a slice design;
(2) provisioning of the interconnections between DCs for the slice instance.

Initial slice configuration can include:
(1) configuration of VNF operations parameters common to all service instances—after slice design;
(2) configuration of VNF interconnection capability common to all service instances—after slice design.

Slice reconfiguration can include:
(1) re-configuration of VNF operations parameters common to all service instances (after a re-design);
(2) re-configuration of VNF interconnection capability common to all service instances (after a re-design).

The re-configuration of VNF operations parameters and VNF interconnection capability generally, though not always, occurs after a re-design has occurred.

Slice usage re-configuration can include:
(1) re-configuration of VNF operations parameters per service instance;
(2) re-configuration of VNF interconnection capability per service instance;
(3) The temporary release (or acquisition) of slice resources to (from) other SOMs (for certain period) and changing the VNF's accordingly (as above). A slice usage re-configuration may be executed, for instance, when the resources are under-utilized and it would be convenient to temporarily release the resources from that slice until they are required again.

The temporary release (or acquisition) of slice resources and changing the VNF's may happen, for instance, due to a service addition to the slice instance, or a service removal from the slice instance.

Slice provisioning configuration can include:
(1) VNF scaling up/down;
(2) VNF interconnection provisioning configuration;
(3) VNF activation deactivation;
(4) Slice termination (may also be done by NM after informing the SOM).

Slice provisioning re-configuration can include:
(1) VNF scaling up/down;
(2) VNF interconnection provisioning configuration;
(3) VNF activation deactivation;
(4) Slice termination (may also be done by NM after informing the SOM).

Figure 6:
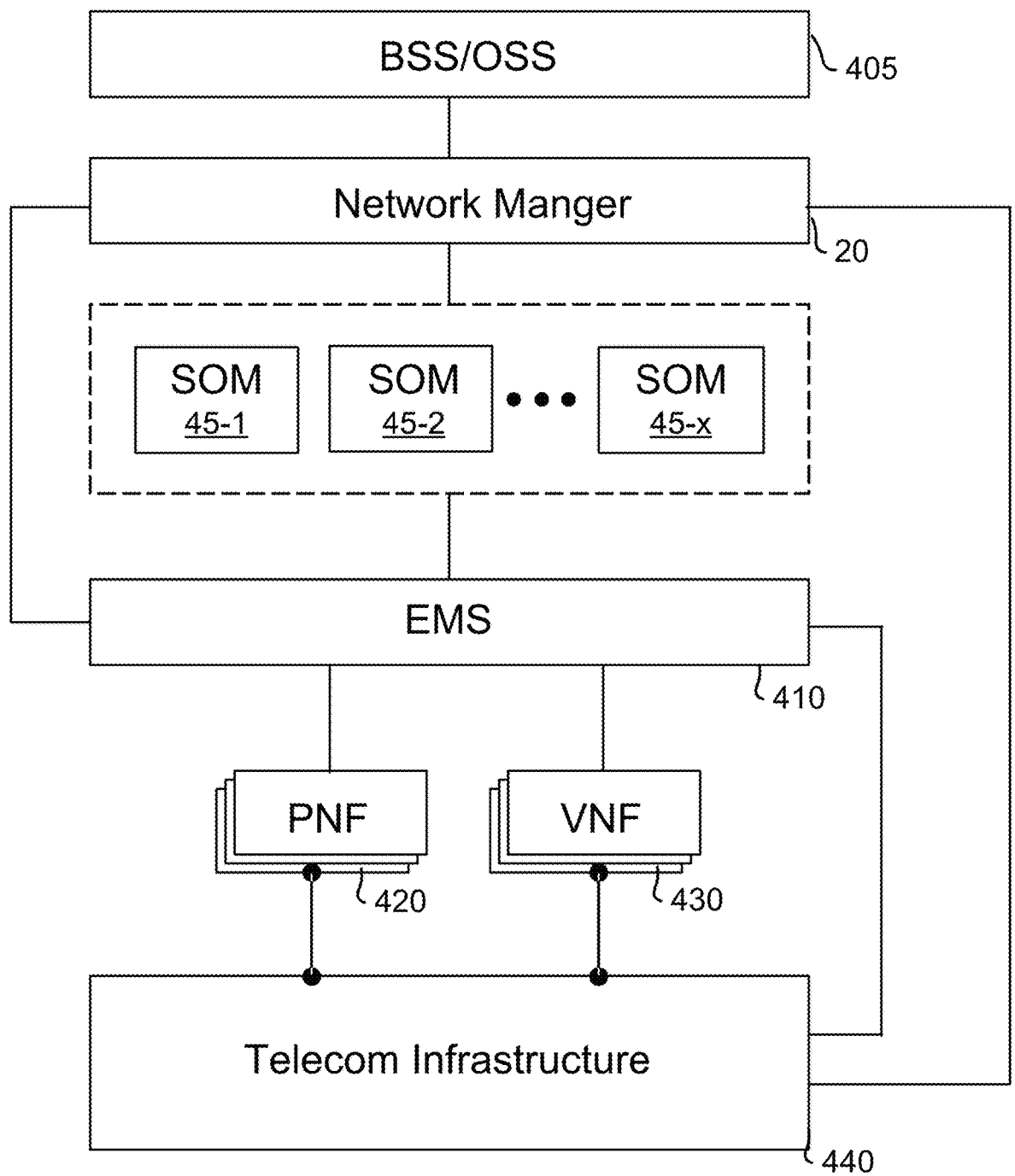
FIG. 6 is a schematic depicting a hierarchical management system according to an embodiment of the invention.
Figure 7:
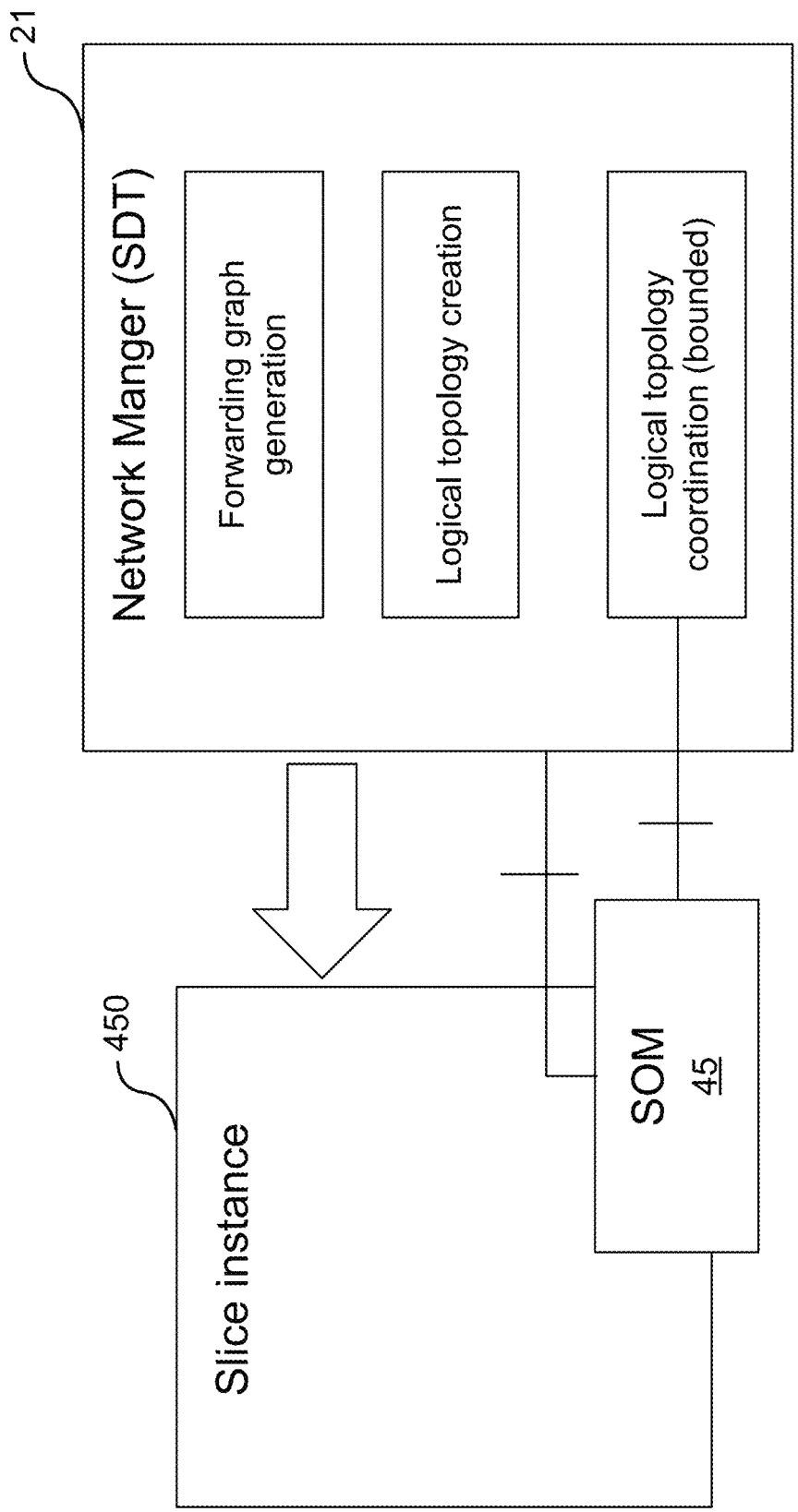
FIG. 7 is a schematic depicting communication between a Network Manager (SDT part) and a slice instance having an associated slice operations manager in a hierarchical management system according to an embodiment of the invention.

FIGS. 6 and 7, schematically depict components of embodiments of the present hierarchical network management system. The present network management system can comprise one or more instances of a slice operations manager ("S-Opt Manager") 45.

The hierarchical network management system of FIGS. 6 and 7 supports embodiments of the systems and methods described throughout this application.

Referring to FIG. 6, a hierarchical network management system is presented. In addition to the conventional business support systems (BSS) and operations support systems (OSS) 405, a network manager (NM) 20 is co-operative with one or more S-Opt Managers (SOMs) 45. In the embodiment of FIG. 6, in place of a single S-Opt Manager 45, a plurality of S-Opt Managers (45-1, 45-2, . . . , 45-x) are illustrated, and each S-Opt Manager 45-1, 45-2, 45-x is responsible for a corresponding slice instance. In some embodiments, an S-Opt Manager 45 may be responsible for more than one slice instance. For the sake of simplicity, this application generally describes a single S-Opt manager 45 responsible for a corresponding slice instance, but this is not intended to be generally limiting. The NM 20 may further be in direct communication with the EMS 410 and the telecom infrastructure 440.

The S-Opt Manager 45, or S-Opt Managers 45-1, 45-2, . . . 45-x as the case may be, interface with the Element Manager Subsystem (EMS) 410. The EMS 410 in turn, communicates with the PNF 420 and VNF 430 associated with the telecom infrastructure 440.

The S-Opt Manager 45 can be instantiated by the NM 20 upon slice creation, or it can be a physical entity with a portion of its resources allocated to the slice, in which case instead of instantiation it may require some degree of initialization or configuration. The S-Opt Manager 45 can be responsible for management of the slice instance. The S-Opt Manager 45 can perform service instance management within the slice instance, including service instance creation, monitoring, modification, and termination. S-Opt Manager 45 is also responsible for slice instance 450 performance monitoring, and slice instance scale-down, if necessary or beneficial.

The NM 20 determines that there is a need or requirement for the creation of a slice (e.g., based on receipt of a pre-configuration request or as the result of a third party service request). Upon the detection of the need, the NM 20 can initiate a slice instantiation procedure. The NM 20 may have an SDT function (referred to as an NM (SDT)) 21 which can select a suitable slice template based on the respective request (received or pre-defined). With the selected template, the NM 20 can define the slice composition and other parameters according to the identified slice template and the request. Those skilled in the art will appreciate that after the creation of a slice, the NM 20 may modify the slice in response to receipt of a request, or detection of a change in the requirements for the existing slice. A similar process as that outlined above for the selection of a template and allocation of resources can be applied.

The NM (SDT) 21 can communicate with MANO entities at a data centre (DC) to request the instantiation of VNFs and the corresponding inter-VNF connections within the DC. The NM (SDT) 21 can instruct the instantiation of a MANO network service to serve the needs of the slice in accordance with the slice composition. The NM (SDT) 21 can request instantiation of the slice operations manager 45 at a DC associated with the slice instance. The NM configures the slice operations manager 45 and the VNFs 430 in the slice instance.

Referring to FIG. 7, in an embodiment, a logical topology for the slice instance is defined by the NM 20 and then delegated to the S-Opt Manager 45 to create and manage a slice instance 450. The delegation may include the NM 20 forwarding graph generation, creating a logical topology, and communicating the created logical topology to the S-Opt Manager 45. The S-Opt Manager 45 being operative to manage the slice instance based on the defined logical topology received from the NM 20.

Figure 8:
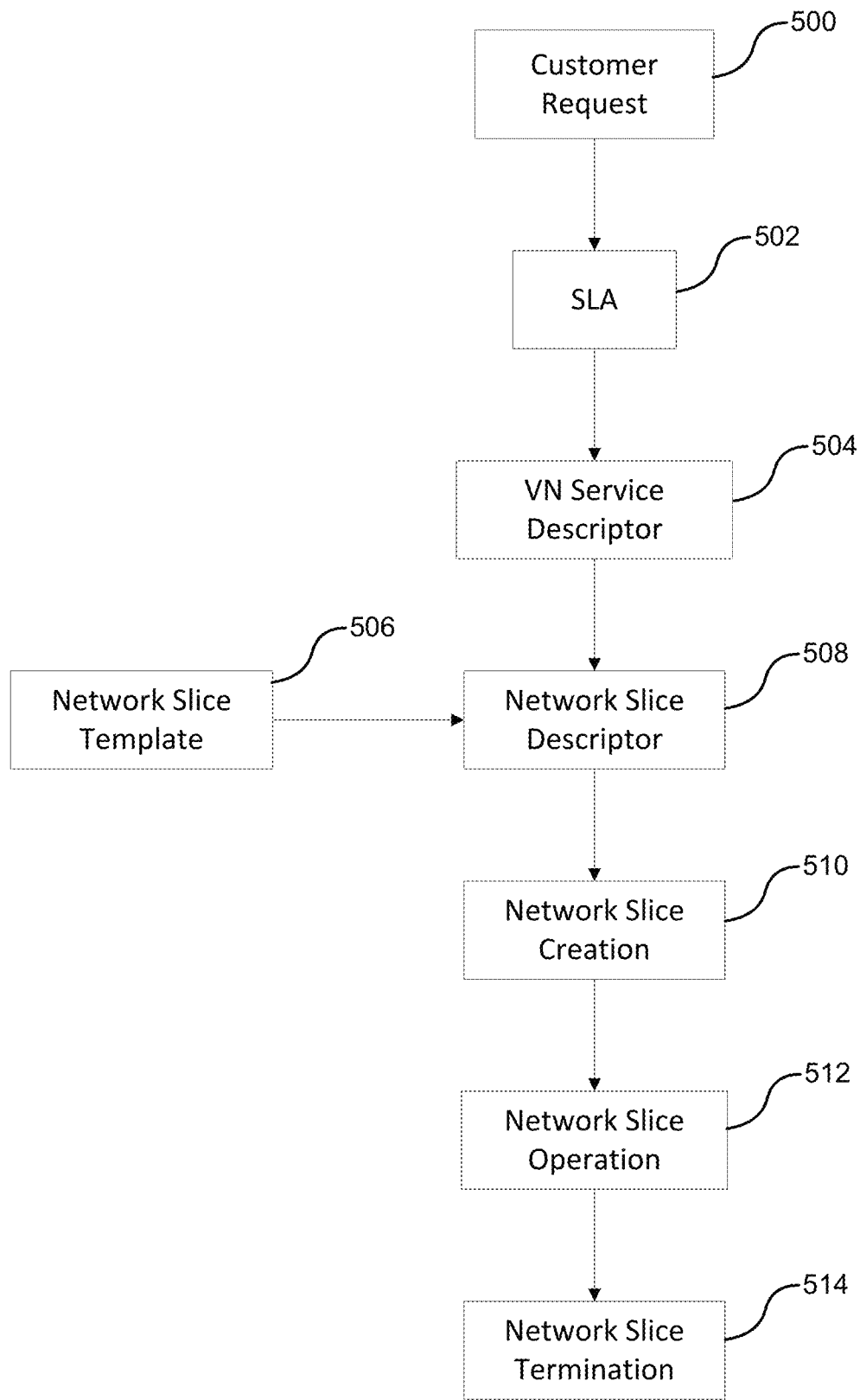
FIG. 8 is a flowchart depicting virtual network service provision when the service is provided by a whole network slice.

FIG. 8 is a flowchart depicting the process of providing a VN service provided by a whole slice. The NM 20 obtains the infrastructure information from DC providers (default/initial abstraction), and then deploys/installs core Management Plane (MP) functions such as OSS services, other NMs, as well as Element Managers (EMs) for Network Entities (NEs). The NM 20 has access to pre-created (or predefined) slice templates and can select 506 an appropriate template based on the identified slice requirements, for example, as set out in the SLA and VN Service Descriptor. The selected template can then be used along with the specific requirements (e.g. geographic scope, expected traffic loads, geographic and temporal distribution of traffic, in network packet processing, etc.) to allocate resources and create the slice (or modify an existing slice). The NM 20 then employs telecommunications grade network virtualization management components (e.g., SONAC management) including a Virtual Infrastructure Manager (VIM) and prepares telecom level network virtualization infrastructure or platform and physical network functions (PNFs).

The NM 20 can create slices 510 dedicated to select services upon receipt of service request. A VN Service Descriptor defining requirements from the network side can be used to characterize requirements associated with known SLA services, (e.g. mapping SLA terms to network service requirements (e.g., capacities, function chains, topology, etc.)). Each network slice goes through a network slice life cycle (i.e., creation, operation and termination), during which it will be managed by a S-Opt-Manager.

If single VN service is provided by a network slice instance, then the VN descriptor may be the same as the Network Slice Descriptor. Although a network slice can be created to serve a plurality of services (typically services with similar traffic profiles, and other similar characteristics), there may be instances in which a slice is dedicated to a single service. In these cases, the VN descriptor and the Network Slice Descriptor may be the same (or suitably similar). As an example, a slice may be created for Machine Type Communications (MTC) traffic, and such a slice may support electrical meters, water meters, and natural gas meters in different services so that the traffic can be directed to different Application Servers and possibly billed to different service providers. In another example, a slice may be dedicated to service dedicated to an emergency service. There may only be a single service supported within the slice, with other similar services being in different slices (e.g. each of the fire department, paramedics and police services may have dedicated network slices to support their services) to provide higher degrees of isolation and reliability of the service.

With reference to FIG. 8, an embodiment of a process for providing a VN service supported by a whole slice is described. In this embodiment, the process steps may be performed, for instance, by the NM 20 and/or the S-Opt Manager 45, and may include the following general steps. At step 500 a customer request is generated or received. The customer request is used to identify a corresponding service level agreement (SLA) which is obtained 502 in relation to the customer request. Although labelled as SLA, step 502 may be understood to be any or all of retrieving, obtaining or identifying an SLA associated with the customer request received in step 500. The SLA may be obtained, for instance, by association with a corresponding customer identifier in the customer request. The SLA defines the services, parameters related to QoS/QoE for the services, and other customer-relevant parameters relevant to slice creation. For instance, the SLA attributes (external) may include, but are not limited to, the following: KPIs for the network; application requirements including service graphs; penalties; user/traffic demand distribution (time/geographical); and charging methods. At step 504 a VN service descriptor that describes the VN service to be supported is determined for use in combination with the SLA. The VN service descriptor to be used in combination with the SLA may be provided as part of the customer request, or it may be determined through a number of other processes including a lookup process. In this manner customer requirements and VN service requirements may be accounted for. The VN service descriptor (internal) may, for instance, define the network requirements for the SLA, and may include, but is not limited to, the following: NF graphs for different service flows; maximum resource requirements for different time periods; and accounting requirements. When the SOM is exposed to a third party, the VN service descriptor may also be exposed if the delegation of management operations to the SOM is Type B, as indicated in FIGS. 5A & 5B. At step 506, a network slice template may be selected based on the identified slice requirements, for example, as set out in the SLA and VN Service Descriptor.

At step 508, a network slice descriptor may be defined or obtained, based on the network slice template selected in step 506. The network slice descriptor defines requirements from the network side and may be used to characterize requirements associated with known SLA services, such as the SLA obtained in step 502. The network slice descriptor defined in step 508 may be understood to be the application of requirements of the VN Service Descriptor from 504 to the Network Slice Template selected or defined in step 506.

In step 510, the NM 20 and/or the S-Opt Manager 45 can then create the network slice based on the network slice descriptor of step 508 (and may optionally used information from the VN Service Descriptor from 504.)

Step 512 indicates network slice operation until in step 514 the network slice is terminated. During operation, the network slice may further be updated with new parameters, rather than being terminated and recreated.

Accordingly steps 500, 502, 504, 506, and 508 relate to pre-planning steps to support network slice creation in step 510. The network slice life cycle (i.e., creation, at step 510, operation at step 512, and termination, at step 514), may further include reconfiguration steps if adjustment of the network slice is required. Referring to FIG. 5B, depending upon requirements some or all of the configuration, operation, reconfiguration, and/or termination steps may be managed by an S-Opt-Manager 45.

Figure 9:
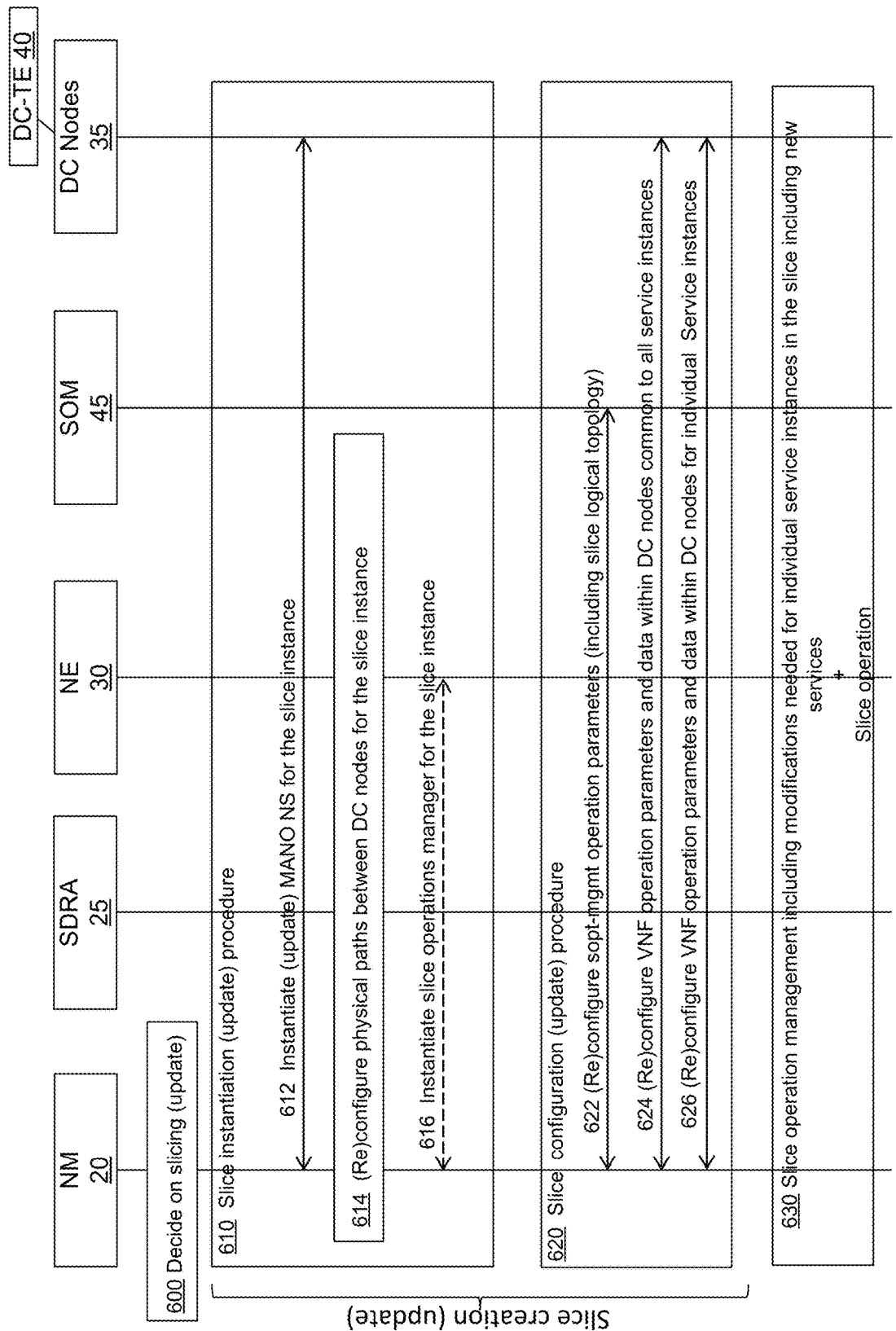
FIG. 9 is a signalling diagram depicting the steps of a slice creation and/or slice update procedure according to an embodiment of the invention.

FIG. 9 is a signalling diagram that illustrates the steps included in an example of a slice creation, or update, procedure. In some embodiments, the steps referred to with respect to FIG. 9 may also be applicable to the updating or reconfiguring of a network slice. The updating or reconfiguring of a network slice may also be understood to be a redesign of the network slice. The steps relevant to the slice update, reconfiguration or redesign are those indicated under the brace labelled "Slice creation (update)".

As noted above, at step 600, the NM 20 first identifies a need for the creation of a new slice, or for the updating of the parameters and configuration of an existing slice. At step 610, the slice creation or update procedure is started. At step 612, the NM 20 communicates with DC nodes 35 to instantiate (or update, if it is an update that is required) MANO NS for the slice instance. At step 614, the paths between the DC nodes 35 for the slice instance are configured, or reconfigured. It should be understood that in some cases, the NM 20 will not have access to the configuration of physical paths within a DC, and in such a case, the NM 20 will configure the logical links between the compute resources allocated to it in the DC. At step 616, in the case of a new slice creation, the NM 20 can instantiate the S-Opt Manager 45 associated with the slice instance. This step is optional if it is decided to reuse the S-Opt Manager 45 of an existing slice instance for the new slice instance.

The next step, step 620, is the slice configuration, or update, procedure. At step 622, the NM 20 transmits instructions to configure (or reconfigure as the case may be) S-Opt Manager 45. The configuration of the S-Opt Manager 45, may include a definition of operation parameters, which can include information about the logical topology. During this the configuration of the S-Opt Manager 45, the NM 20 can also communicate with DC nodes 35, at step 624, to configure, or reconfigure, VNF operation parameters. This may result in a modification to functions that are common between different service instances. The modification of a VNF that is common to different service instances should be done such that the modifications do not adversely affect the operation of the VNF for the other service instances. Finally, also during this procedure, the NM 20 can communicate, at step 626, with DC nodes 35 to configure, or reconfigure, VNF operation parameters and data within DC nodes 35 for individual service instances.

At step 630, following slice creation (or update) and instantiation (or update) of the S-Opt Manager 45, the resources within the slice operate under the control of the S-Opt Manager 45. The slice operation management can include modifications to the parameters under which the allocated resources operate as needed for the support of individual service instance in the slice, including new services.

Figure 10:
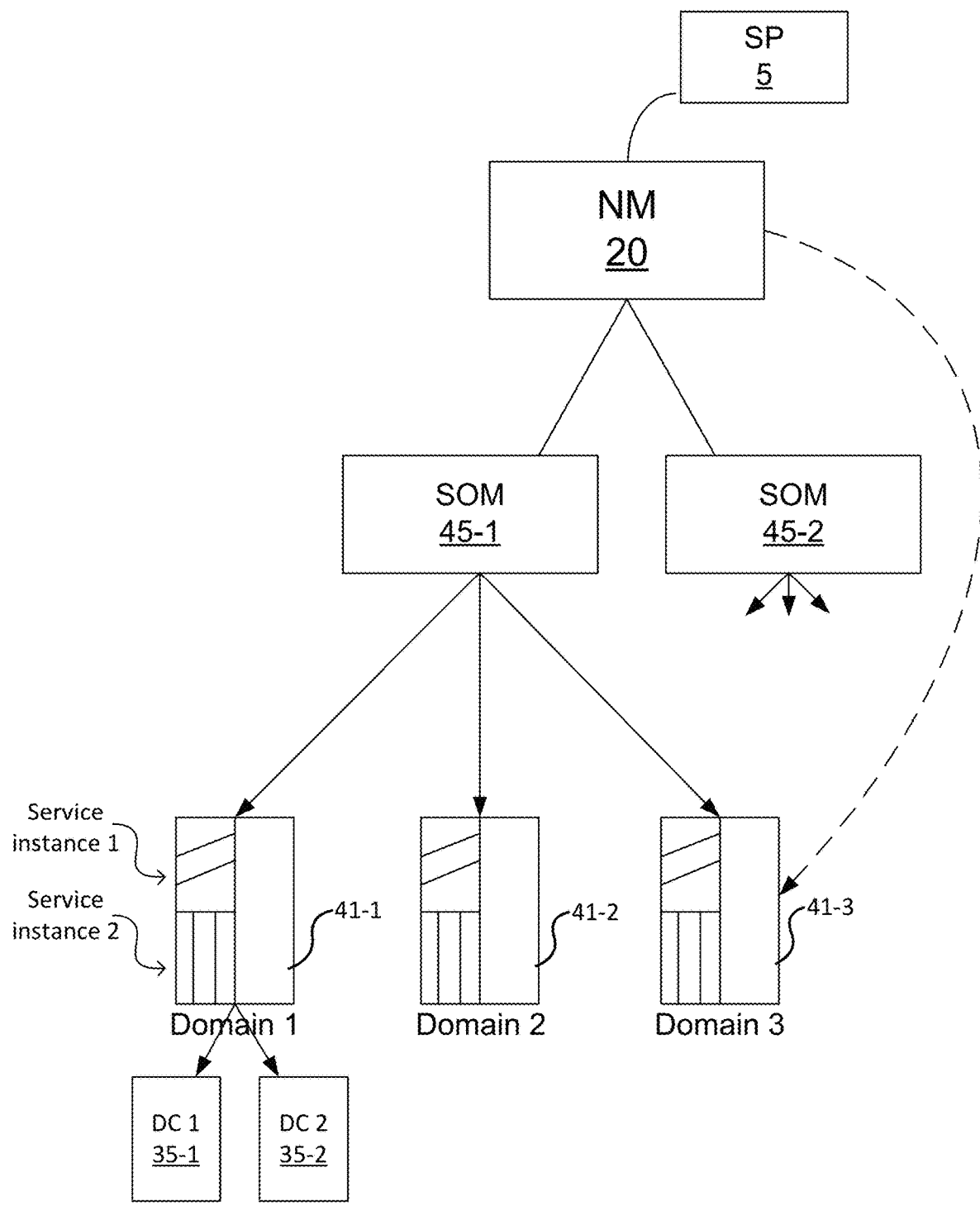
FIG. 10 is a schematic depicting a hierarchical management system comprising multiple slice operation managers according to an embodiment of the invention.

FIG. 10 schematically depicts a hierarchical management system in which an NM 20 determines the requirement for network slicing. As noted above, this requirement may be due to a pre-configuration requirement or it may be in response to a service request from a third party service provider ("SP"). The NM 20 is responsible for creation, modification, and termination of slice instances.

Each slice may be operative to support one or more services. For example, a slice may be operative to support utility meters (MT-communications) in general, and be operative to support both gas meters and electrical meters as separate/isolated services on that slice.

A domain is a group of physical network resources. The DC1 35-1 and DC2 35-2 are examples of data centers that may support Domain 1 41-1. FIG. 10 indicates that the SOM 45-1 supports one or more services, in this case Service instance 1 and Service instance 2) on a slice that extends across 3 domains 41-1 41-2 41-3. In this embodiment the three domains combined together support the slice instance. Another SOM 45-2 may support other domains (overlapping or not) which are not illustrated in FIG. 10.

In FIG. 10 the blank area illustrated in part of each domain is indicative of free resources available in that domain that are not being used by service instance 1 or service instance 2. Accordingly, the free resources are available to be allocated to service instance 1 or service instance 2 in the future, may used by other slice managers (e.g. SOM 45-2), or allocated to other network resource needs.

With instantiation of the network slice(s), there is also instantiation and virtualization of an S-Opt Manager 45 for each slice. The S-Opt Manager 45 performs management of slice instance. It is important to note, however, that each S-Opt Manager 45 can be responsible for a single network slice or for multiple network slices. The S-Opt Manager 45 is responsible for per slice instance management, which allows for isolated/independent management of slice instance and related management plane data. Each S-Opt Manager 45 comprises control plane ("CP") functions, such as, but not limited to fault management ("FM"), configuration management ("CM") and performance management ("PM") functions. Accordingly, during slice management, the S-Opt Manager 45 is responsible for:

creation, modification, termination, performance monitoring of service instances within the slice instance;

releasing temporarily unnecessary resources;

informing NM (SDT) to conditionally use the released resource (e.g., with time limit, with pre-notification);

maintain service specific policies within the slice specific policies; and keeping track of service specific service requirements.

In operation, the S-Opt Manager 45 performs FM and PM functions. As a result of the functions the S-Opt Manager 45 may identify the need for additional resources in order to meet service requirements. The S-Opt Manager 45 communicates a request for additional resources to the NM, which then determines how to respond to the request and allocates or reconfigures resources as necessary. In the case where the S-Opt Manager 45 determines that fewer resources are required for the service, the S-Opt Manager 45 can temporarily (e.g., for certain time period) release those resources and notifies the NM about the temporary resource release, which then determines how to reuse the released resource temporarily (e.g., within the specified time period).

Figure 11:
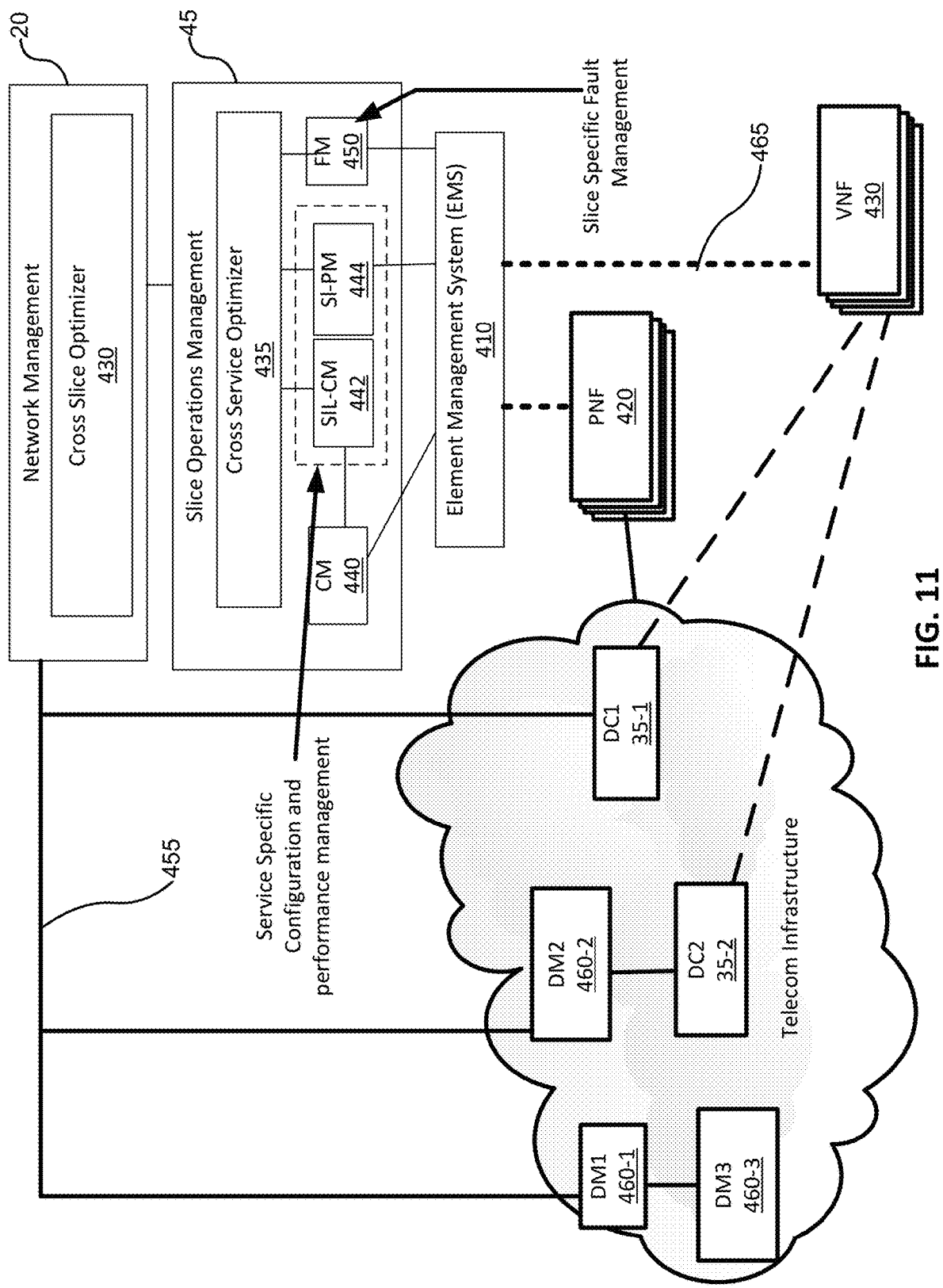
FIG. 11 is an illustration of an architecture for management plane operation in accordance with an embodiment of the invention.

FIG. 11 illustrates an embodiment of another architecture for network management plane functions. Within a telecommunications infrastructure, data centers (DC1 35-1, DC2 35-2) and Domain Managers (DM1 460-1, DM2 460-2, DM3 460-3) can be arranged in a number of different hierarchical arrangements, where the DC (35-1, 35-2) can communication with the Network Management Function (NM 20) directly or through a Domain Manager 460-1, 460-2, 460-3 (and where a DM, in some embodiments DM3 460-3, may communicate to the network management functions through another DM, in some embodiments DM1 460-1). This interface to the Network Management Functions (shown in a solid dark line 455) can be used to allocate resources for a slice, create a slice, and initialize the network functions within a slice. The network management functions can include a cross slice optimizer 430 that can monitor resource usage against allocations and service level agreements. Instructions and data can be provided to the S-Opt Manager 45 (which may have with a cross service optimizer 435). Other S-Opt Manager 45 functions including fault management 450, configuration management 440, and service specific configuration and performance management functions dedicated to performance management 444 and slice or service specific configuration management 442, communicate with the element management system 410. The Element Manager Subsystem (EMS) 410, in turn, communicates with the PNF 420 and VNF 430 associated with the telecom infrastructure (not illustrated in FIG. 11). After allocation of resources, slice creation and function instantiation, modifications, and further instantiations of VNFs 430 can be managed using the EMS 410 and SOM 45 through communications paths illustrated as the dark dotted lines 465.

The EMS 410 can interact with elements within domains DM1 460-1 DM2 460-2 DM3 460-3, or domain managers associated with these domains, to manage the network elements located in the domains DM1 460-1 DM2 460-2 DM3 460-3. In some embodiments, the EMS 410 may include the domain managers of the domains DM1 460-1 DM2 460-2 DM3 460-3.

In a traditional network fault management is typically provided by a common function. Fault management has conventionally been considered to be a service provided at the infrastructure level, thus it would be a common service across all network slices if there are any. In the presently disclosed embodiment each SOM 45 has one or more associated FMs 450. In some embodiments, each SOM 45 may have a plurality of FMs 450, each FM 450 corresponding to a separate slice such that there is a different FM 450 for each slice (a slice-specific FM 450). Previously the NSMF would be responsible for reporting for all slices.

In an embodiment a slice-specific FM 450 may be operative to detect a fault in the underlying physical elements and to transmit a fault management report to the EMS 410 in order to identify what physical element has which fault. Accordingly, the EMS 410 may be operative to receive the fault management report(s) to facilitate management of the domains DM1 460-1 DM2 460-2 DM3 460-3, and to allocate/re-allocate physical resources as necessary to maintain required service levels.

In an embodiment, the NM 20 directly controls the data center (DC1) 35-1. In some embodiments, the NM 20 may control a DC2 35-2 through an associated Domain Manager DM2 460-2.

Figure 12:
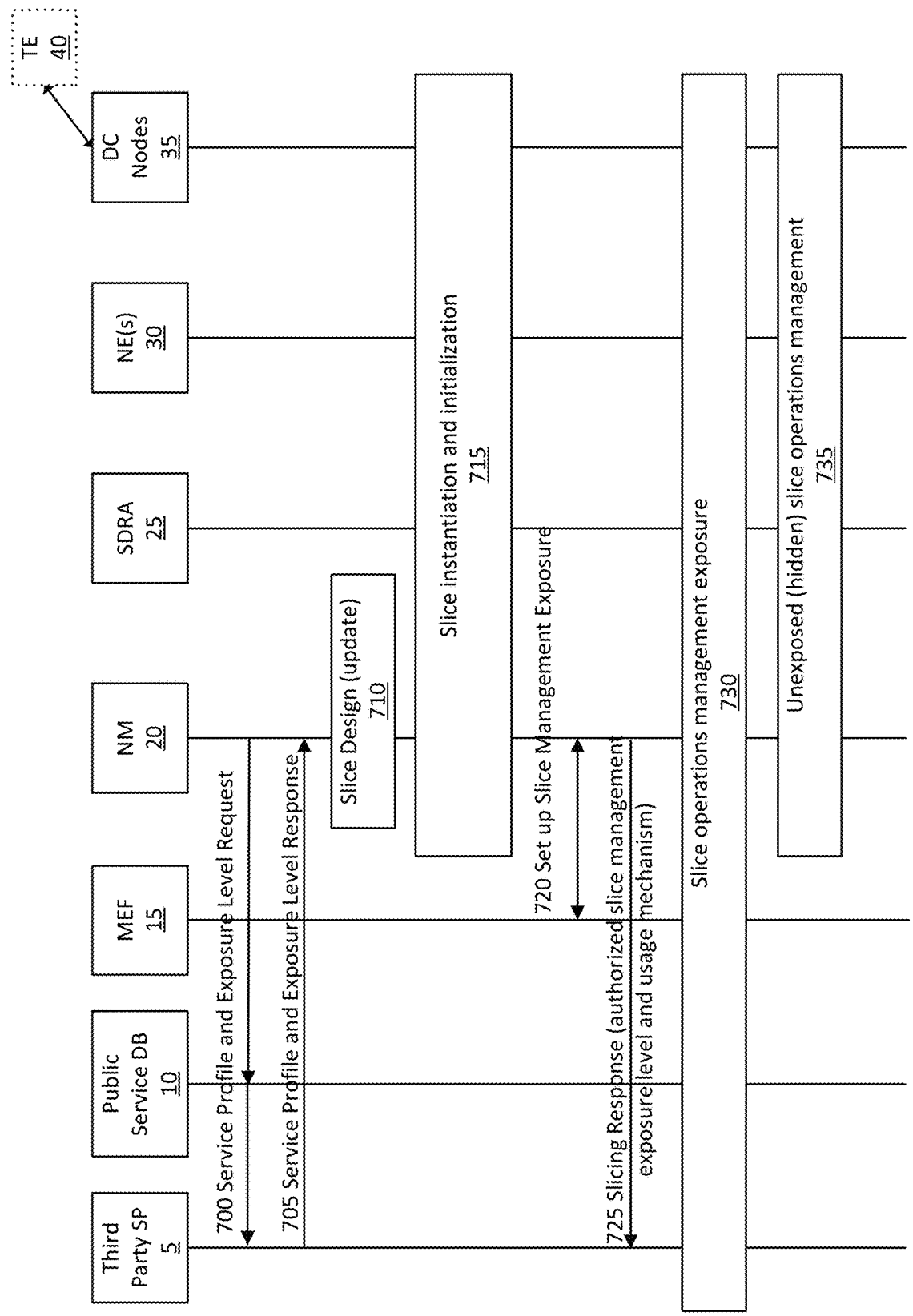
FIG. 12 is a signalling diagram depicting some embodiments of slice creation, configuration, and re-design with a management exposure interface exposing selected slice operations management to external entities.

Referring to FIG. 12, a signalling diagram depicting some embodiments of slice creation, configuration, and re-design with a management exposure interface operative to expose selected slice operations management to external entities is illustrated. In step 700 the Network Manager (NM) 20 transmits a service profile and exposure level request to the external entity, such as a network function within the third party service provider (SP) 5. The third party SP 5 may typically comprise a network function or interface associated with a customer, or their provider, who has requested the slice and would like some level of management control over that slice. In some aspects, the third party SP 5 may be an entity associated with the network operator. The use of a third party network management exposure interface may be more convenient than interfacing with the NM 20 directly. The service profile and exposure level request indicating a proposed service profile and level of management operations exposure for a network slice to be accessed by the third party SP 5. The management operations exposure may include, for instance, available management functions, control plane functions, and user plane functions for exposure through the management exposure interface. The service profile and exposure level may also be forward to a public service database (DB) 10. The 3rd party SP 5 and the NM 20 negotiate for slice management exposure levels. PSDB 10 may be accessible publicly, or it may only be available to select entities upon authentication.

In some embodiments, the service profile and/or the exposure level in step 700 may be provided to the 3rd party in response to a service request made by the 3rd party.

In embodiments that include a management exposure function (MEF), once the management capability, configuration methods, and the limitations (e.g. resources) are provided to the SOM, the 3rd party is able to orchestrate, manage and operate the network slice independently within the limitations specified by the NM 20. The limitations may be in the delegation of slice operations to the SOM, or may be in the operations exposed through the MEF. In some embodiments, only a subset of the delegated SOM's operations are exposed to the third party.

The NM 20 does not need to monitor the operations happening within the scope of the SOM. The NM 20 can restrict its operations to other slices independent of already exposed slicing management operations.

PSDB 10 may be accessible publicly, or it may only be available to select entities upon authentication and/or authorization.

In step 705 the third party SP 5 transmits to the NM 20 a service profile and exposure level response which may include an indication of selected management plane functions, control plane functions, and user plane functions. In step 710 the NM 20 completes the slice design, based on the received service profile and exposure level response. If there is an existing slice that is being modified to suit the needs of the $3^{rd}$ party request, step 710 may be an update of the slice parameters. In step 715 the designed (or updated) slice(s) are instantiated and initialized by coordinated action of the NM 20, the Software Designed Resource Allocation (SDRA) entity 25, one or more network entities 30, and the Data Center (DC) nodes 35 that make up the network. A Traffic Engineering entity 40 is also illustrated as exchanging communications with the DC nodes 35. In step 720 the NM 20 communicates with a Management Exposure Function (MEF) 15 to set up the management exposure for the slice, based on the service profile and exposure level response. The MEF 15 can be implemented within NM 20, a Slice Operations Manager (SOM 45), or as standalone function. The MEF 15 is the interface between the 3rd party SP and entities within the management plane of the slice. MEF 15 may also provide authentication of a party making a request and validation of the requested slice management operations before the request is transmitted to entities within the management plane that can act on the instructions. The MEF 15 may respond to 3rd party exposure discovery requests and provides the details (what and how) of available exposed management functionalities so that the 3rd party can directly transmit instructions for the management of the slice. In step 725 the NM 20 transmits a slicing response to the third party SP 5 including the authorized slice management exposure level, and the usage mechanism for implementing the management over the slice. The NM 20 informs the 3rd party SP 5 of the slice management exposure level(s) (which may be the result of an agreement between the NM 20 and the SP 5) and associated MEF information (e.g. IP address of the MEF, the port associated with the service, and possibly which credentials are required to be provided to validate a request). The slice management exposure levels may include combinations of exposing slice management functionality, and/or differentiated levels between slices, ranging from unexposed to partially exposed and to fully exposed.

In step 730 all entities may operate in a coordinated fashion to execute the authorized management operations through the MEF 15. In step 735, some management operations (i.e. "non-selected" or unauthorized management operations) may remain hidden or "unexposed" from the third party SP 5. These operations may be available for execution by the NM 20, SDRA 25, NE(s) 30, and DC nodes 35 without access and/or discoverability by the third party SP 5 through the MEF 15. As such, the $3^{rd}$ party SP 5 will not be able to request the execution of functions outside the set of functions made available.

Figure 13A:
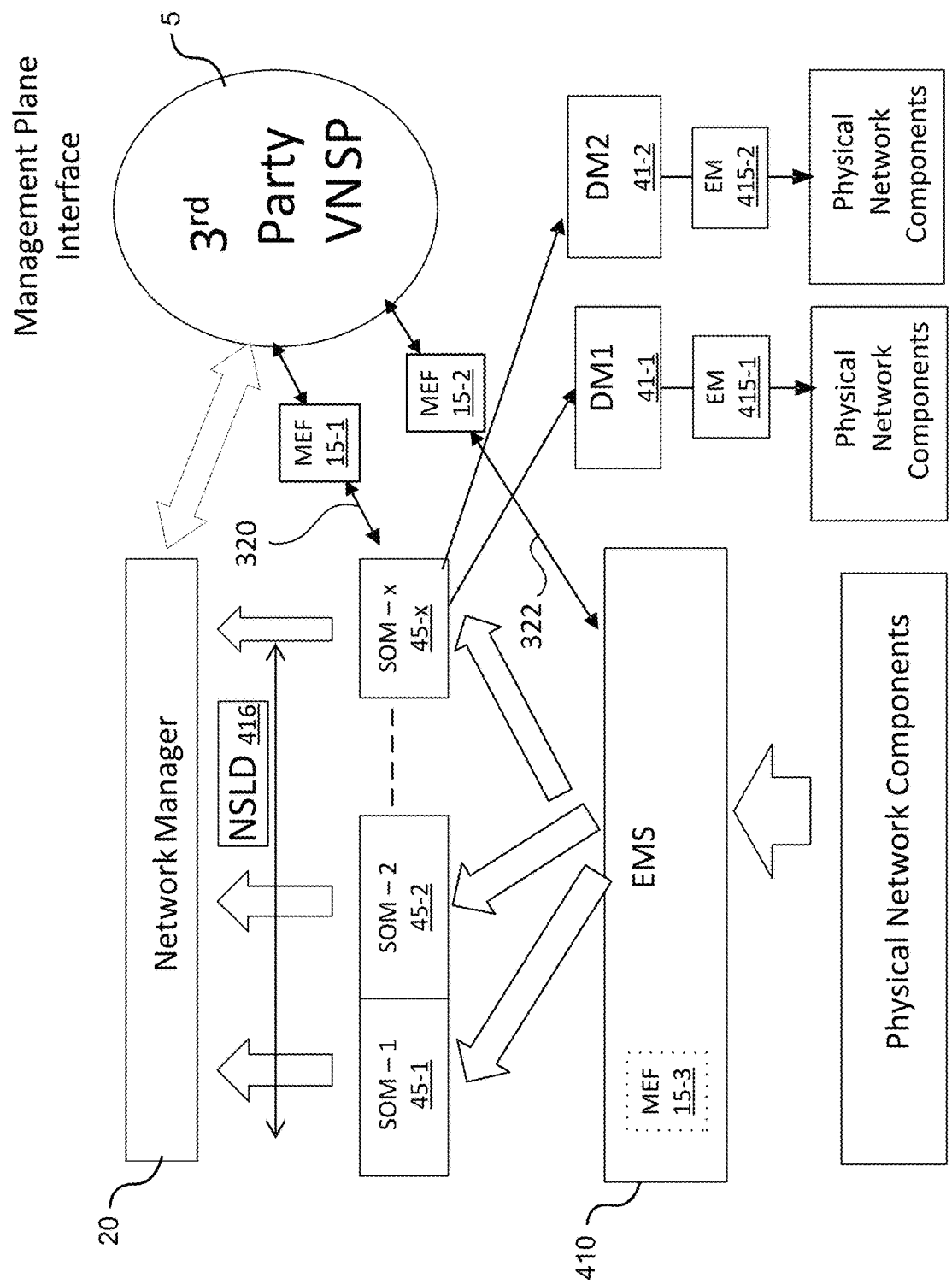
FIG. 13A is a system diagram illustrating some embodiments of a system for providing external management exposure to selected slice operations management.

Referring to FIG. 13A, a system diagram illustrating some embodiments of a system for providing external management exposure to selected slice operations management is presented.

FIG. 13A illustrates three alternate embodiments for the MEF 15.

A standalone MEF 15-1 may be operative to support one or more SOM (e.g. 45-1, 45-2, . . . 45-x). In some embodiments, each MEF 15-1 corresponds directly to an associated SOM 45-x. In some embodiments, not illustrated, an MEF 15 corresponds directly to an associated plurality of SOMs 45-1, 45-2, . . . 45-x. In some embodiments, a standalone MEF 15-2 is operative to correspond directly with the EMS 410, and the EMS 410 communicates with the relevant SOM-1 45-1, SOM-2 45-2, . . . , SOM-x 45-x. In some embodiments, a MEF 15-3 may comprise a part of the EMS 410. The MEF 15-3 operative to receive requests from a third party SP 5, and to engage an appropriate SOM 45-1, 45-2, . . . , 45-x through the EMS 410. In these embodiments, the MEF 15-1 15-2 15-3 may be operative to receive requests from an external third party VN SP 5 and to identify a corresponding SOM 45-1, 45-2, . . . , 45-x responsive to the request.

In some embodiments, the MEF 15-1 15-2 15-3 may be operative to transmit network management information to the third party SP 5. By way of example, the network management information may include network events, measurements, and/or reports that may be transmitted to the third party SP 5 through the MEF 15-1 15-2 15-3.

In some implementations, an MEF 15 may be further operative to determine whether the request corresponds to the NM 20 or an SOM 45, and direct the query accordingly.

As illustrated, the physical network components interface with Element Manager(s) (EMs) 415-1 415-2. A collection of EMs may be denoted as an Element Manager Subsystem (EMS) 410. The EMS 410 may interface with one or more slice operations managers (S-opt manager or SOM). Each SOM 45-1, 45-2, . . . , 45-x interfaces with one or more domain managers (41-1, 41-2, etc.,), which are connected through corresponding EMs (415-1, 415-2 . . . ) to underlying physical network components. The NM 20 controls the SOMs 45-1, 45-2, . . . , 45-x and adjusts functionality through a Network SLice Descriptor (NSLD) 416. As illustrated, a management plane interface is provided, which engages with the MEF 15 to extend control over selected management functions to the third party SP 5.

Depending upon the implementation, the MEF 15 may be a stand alone entity, or it may be instantiated across one or more other entities. For instance, in an aspect the MEC 15-3 may comprise a part of the EMS 410 for exposing element management. Where the MEF 15 comprises a part of the EMS 410, external intelligence may be provided through access to the SOM 45 for exposing slice operations management. In some aspects, the external intelligence may ultimately be provided by the NM 20.

In an aspect, the MEF 15 may be distributed between an SOM 45 and the EMS 410. In some aspects, these distributed functions may be collocated physically, and share the same IP address (but, possibly different ports). In some aspects, a distributed MEF 15 may have components instantiated in different locations and have different IP addresses for each location.

Figure 13B:
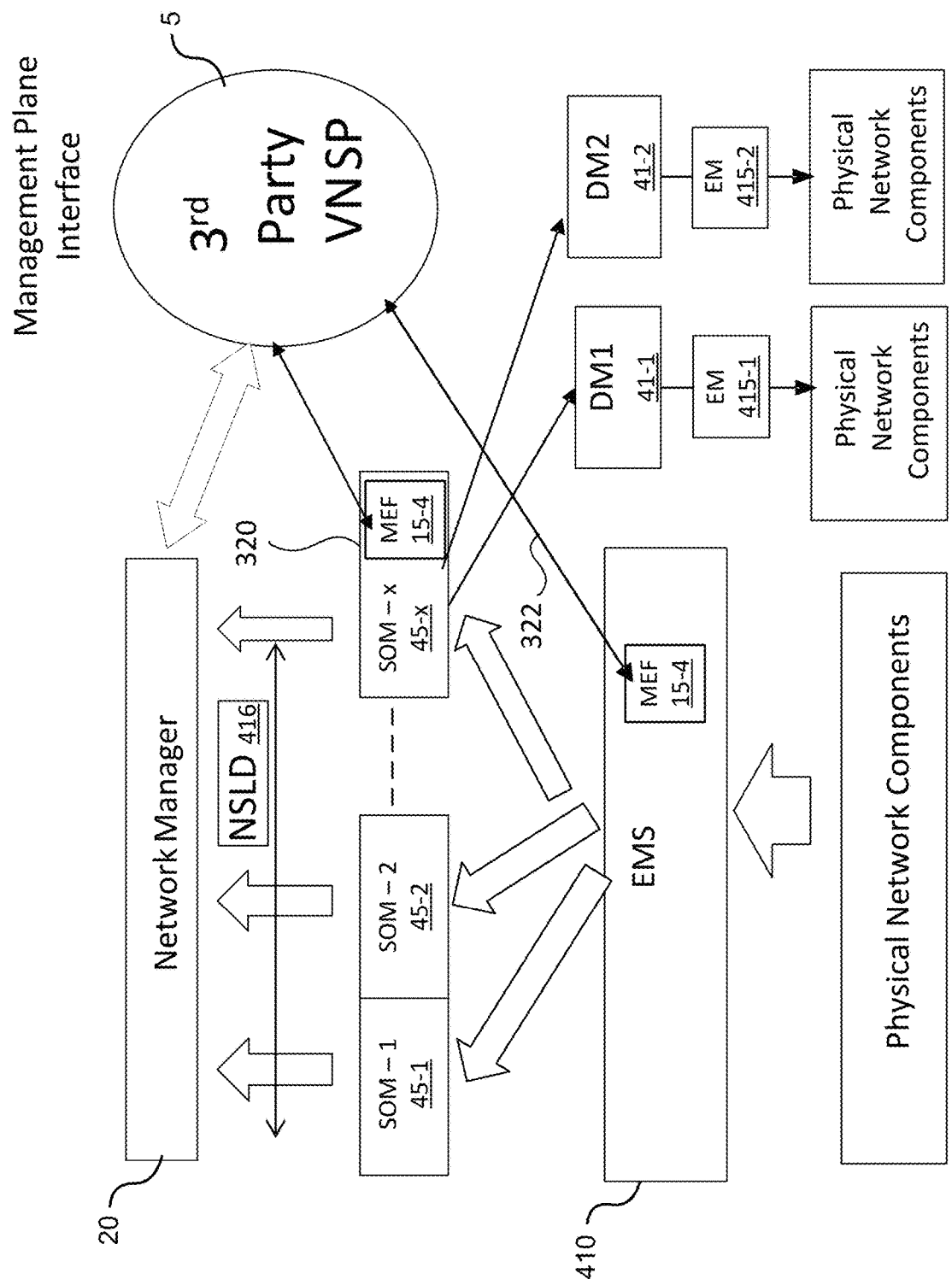
FIG. 13B is a system diagram illustrating an embodiment of a system for providing external management exposure to selected slice operations management.

FIG. 13B illustrates an embodiment where a MEF 15-4 is distributed between an SOM 45-x and the EMS 410. In the embodiment illustrated in FIG. 13B, only SOM 45-x includes a MEF 15-4. In this embodiment the other SOM 451 and SOM 45-2 may either not be exposed to the third party SP 5, or may be exposed through the EMS 410.

In some embodiments other SOM 45, such as SOM 45-1 and SOM 45-2 may also include a MEF 15-4.

Referring to FIGS. 13A and 13B, slice management exposure can be realized by exposing slice management APIs via the MEF 15. This allows the third party SP 5 to access the management plane functionality through a defined API. Upon receipt of a management exposure request, the MEF 15 may respond with the information about which management functionality is exposed or unexposed to the requesting party. Prior to provision of such information, the MEF 15 may require authentication of the requesting entity.

In an implementation, the MEF 15 is responsible for authenticating and validating API-based slice management requests. The MEF 15 may perform the authentication and validation operations, for instance, by interacting with other management entities including, for instance, one or more security entities. As illustrated, the management exposure interface includes interconnections 320 and 322 to provide a third party with regulated access to the s-Opt-Manager (SOM) 45, and the EMS 410 respectively. Interconnection 320 can be used to support VN service requests with at least one of management/control/user plane exposure levels. When an external party, such as the third party SP 5, connects to the management exposure interface, the MEF 15 may obtain authentication and authorization of the external party before displaying available management control features, or providing access to the management control operations. Those skilled in the art will appreciate that in different embodiments, only one of 320 and 322 may be provided. For example, in some embodiments, the 3$^{rd}$ Party SP 5 may only be able to interact with the SOM 45 through MEF 15, and will not be provided with a mechanism to interact with the EMS 410. In such embodiments, modification of parameters at the EMS 410 would be achieved by providing functional requirements to the SOM 45, or even the NM 20, which would then determine the required instructions to provide the EMS 410.

Figure 14:
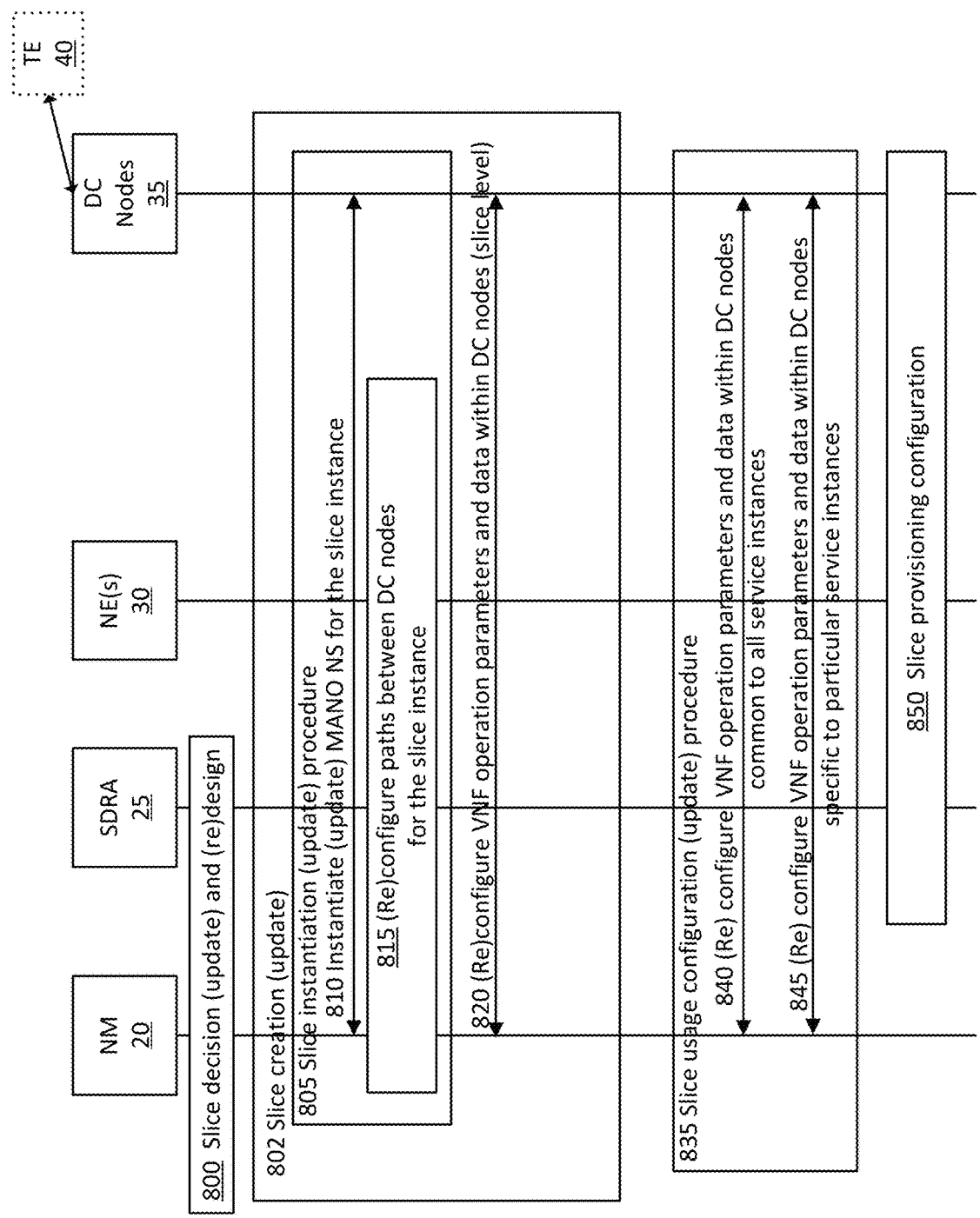
FIG. 14 is a signalling diagram illustrating an embodiment of combinations of slice creation, configuration and re-design functions based on the table of FIG. 5A.

FIG. 14 is a signalling diagram illustrating an embodiment of combinations of slice creation, configuration and re-design functions based on row A of the table of FIGS. 5A and B. In step 800 the NM 20 determines the slice requirements for slice creation. As the steps are also applicable to slices that are being updated or reconfigured (i.e. re-designed), the text within brackets in the figure denote inclusion of reconfiguration or re-design operations in addition to initial slice set up and creation operations. The information upon which the slice requirements are based may be received by the NM 20 in the form of a request from a third party.

Step 802 identifies the slice creation, or update, operations required to satisfy the requirements. In step 835 slice usage configuration, or update, operations are identified. Slice usage may be any fraction of the slice resources initially allocated during step 802 slice creation, or update, operations. As indicated above, one utility of slice usage configuration, update, procedures, is to allow for excess network resources that are allocated to the slice, to be released if they are no longer required. Step 850 relates to slice provisioning configuration, and supporting the slice maintenance functions during the life of the slice.

Slice creation, or update, operations 802 includes the slice instantiation, or update, procedure 805 and VNF operation parameter configuration 820. The slice instantiation or update procedure 805 includes the instantiation or update of a MANO network slice 810. The instantiated or updated MANO slice instruction is sent from the NM 20 to DC Node(s) 35. In step 815 the NM 20, in communication with the SDRA 25 and one or more NE(s) 30, configures, or reconfigures in the case of an update, the paths between DC nodes 35 for the slice instance. This step may include defining or redefining the logical links between network functions instantiated upon resources in different Data Centers. In step 820 the NM 20 configures, or reconfigures in the case of updates, the VNF operation parameters and data within the DC nodes 35 at the slice level.

The slice usage configuration, or update, procedure 835 includes the NM 20 configuring, or reconfiguring in the case of an update, VNF optional parameters and data within DC nodes 35 (or data associated with network functions instantiated upon the resources within DC nodes) that are common to all service instances 840. The NM 20 also configures, or reconfigures in the case of an update, VNF operation parameters and data within DC nodes 35 specific to particular service instances 845. The slice usage configuration procedure 835 is an optional procedure to scale consumed network resources within the limits set during the slice creation, or update, procedure 802.

Figure 15:
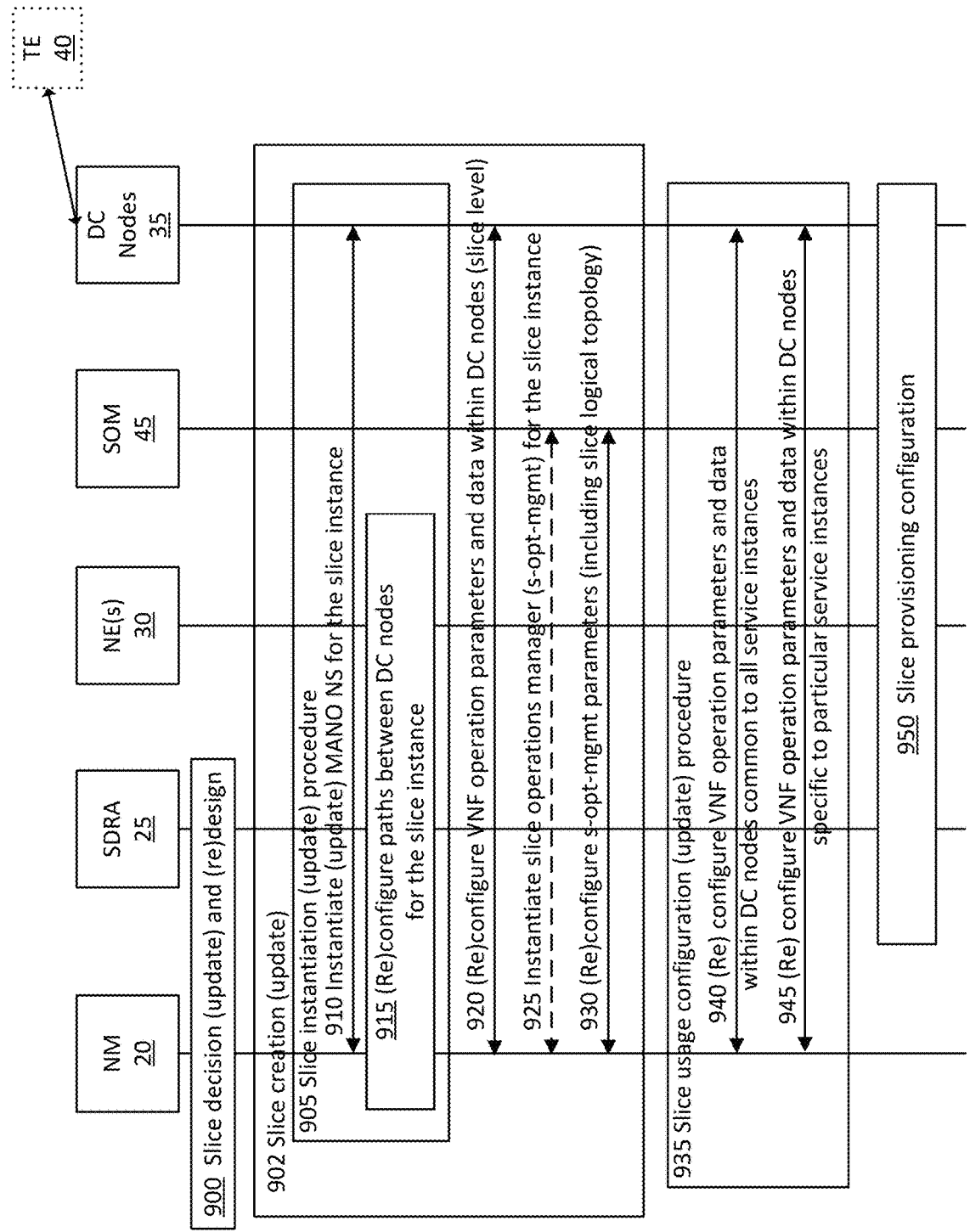
FIG. 15 is a signalling diagram illustrating an embodiment of combinations of slice creation, configuration and re-design functions based on the table of FIG. 5A.

FIG. 15 is a signalling diagram illustrating an embodiment of combinations of slice creation, configuration and re-design functions based on row B of the table of FIGS. 5A and B.

In the embodiment of FIG. 15, the SOM 45 is responsible for slice provisioning (re)configuration, as indicated in FIGS. 5A and 5B.

In step 900 the NM 20 determines the slice requirements for slice creation. As noted above, this determination may be performed in accordance with requirements provided in a slice creation request received from the 3$^{rd}$ party. As the steps are also applicable to slices that are being reconfigured (i.e., re-designed), the text within brackets in the figure denotes inclusion of reconfiguration or re-design operations in addition to initial slice set up and creation operations.

Step 902 identifies the slice creation, or update, operations, while step 935 identifies slice usage configuration, or update, operations. Slice usage may be any fraction of the slice resources initially allocated during step 902 slice creation, or update, operations. As indicated above, an important utility of slice usage configuration, update, procedures, is to allow for excess network resources that are allocated to the slice, to be released. Step 950 relates to slice provisioning configuration, and supporting the slice maintenance functions during the life of the slice.

In some embodiments, the NM 20 may coordinate with the SOM 45 to conduct the slice provisioning configuration.

Slice creation, or update, operations 902 includes the slice instantiation, or update, procedure 905, VNF operation parameter configuration 920, slice operations manager (SOM or s-opt-mgmt 45) instantiation 925, and SOM/s-opt-mgmt parameter configuration 930. The slice instantiation, or update, procedure 905 includes the instantiation, or update, of the MANO NS for the slice instance 910. The instructions associated with the instantiation or update of the MANO NS are sent by the NM 20 to the DC node(s) 35. In step 915 the NM 20, in communication with the SDRA 25 and one or more NE(s) 30, configures, or reconfigures in the case of an update, the paths between DC nodes 35 for the slice instance. In step 920 the NM 20 configures, or reconfigures in the case of updates, the VNF operation parameters and data within the DC nodes 35 at the slice level. In step 925 the NM 20 instantiates the required SOM/s-opt-mgmt 45 for the slice instance. In step 930 the NM 20 configures, or reconfigures in the case of updates, the SOM/s-opt-mgmt parameters and data including slice logical topology.

The slice usage configuration, or update, procedure 935 can include the NM 20 transmitting instruction to configure, or reconfigure in the case of an update, VNF optional parameters and data within DC nodes 35 common to all service instances 940. The NM 20 also configures, or reconfigures in the case of an update, VNF operation parameters and data within DC nodes 35 specific to particular service instances 945. The slice usage configuration procedure 935 is an optional procedure to scale consumed network resources within the limits set during the slice creation, or update, procedure 902. It should be understood by those skilled in the art that where reference is made to a function, such as NM 20, configuring parameters at a DC (in reference to this figure or others), it is possible that the NM 20 will only issue configuration parameters, or configuration instructions. This will allow management entities within the DC to perform site specific configuration operations without requiring the NM 20 to have exhaustive knowledge of the different configurations at each DC.

Figure 16:
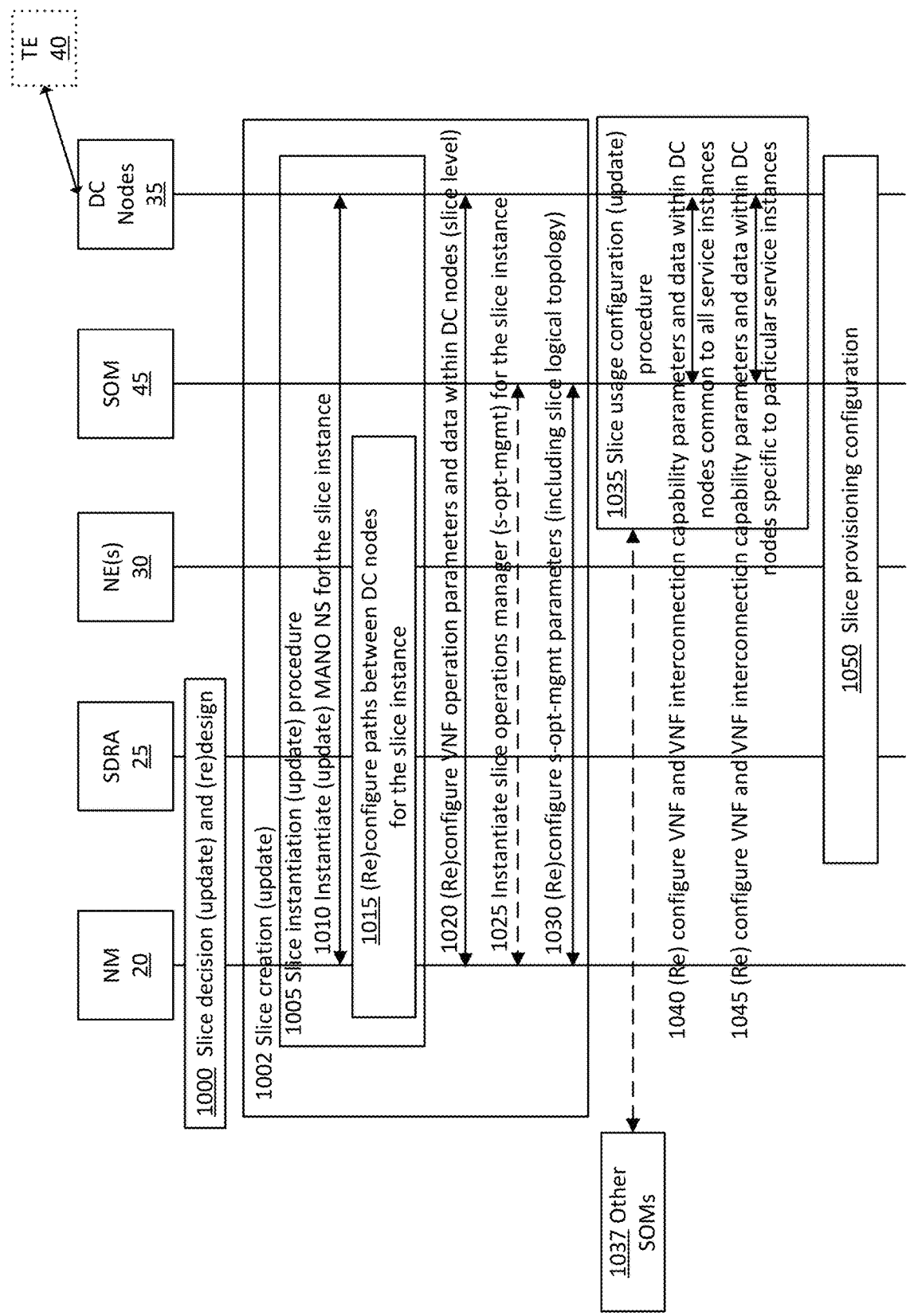
FIG. 16 is a signalling diagram illustrating an embodiment of combinations of slice creation, configuration and re-design functions based on the table of FIG. 5A.

FIG. 16 is a signalling diagram illustrating an embodiment of combinations of slice creation, configuration and re-design functions based on row C of the table of FIGS. 5A and B.

In the embodiment of FIG. 16, the SOM 45 is responsible for slice usage and slice provisioning (re) configuration, as indicated in FIGS. 5A and 5B.

In step 1000 the NM 20 determines the slice requirements for slice creation. As the steps are also applicable to slices that are being reconfigured (i.e., re-designed), the brackets denote inclusion of reconfiguration or re-design operations in addition to initial slice set up and creation operations.

Step 1002 identifies the slice creation, or update, operations, while step 635 identifies slice usage configuration, or update, operations. Slice usage may be any fraction of the slice resources initially allocated during step 1002 slice creation, or update, operations. As indicated above, an important utility of slice usage configuration, update, procedures, is to allow for excess network resources that are allocated to the slice, to be released. Step 1050 relates to slice provisioning configuration, and supporting the slice maintenance functions during the life of the slice.

Slice creation, or update, operations 1002 include the slice instantiation, or update, procedure 1005, VNF operation parameter configuration 1020, slice operations manager (SOM or s-opt-mgmt 45) instantiation 1025, and SOM/s-opt-mgmt parameter configuration 1030. The slice instantiation, or update, procedure 1005 includes the instantiation, or update, of the MANO NS for the slice instance 1010. The instructions associated with the instantiation or update of the MANO NS are sent by the NM 20 to the DC node(s) 35. In step 1015 the NM 20, in communication with the SDRA 25 and one or more NE(s) 30, configures, or reconfigures in the case of an update, the paths between DC nodes 35 for the slice instance. In step 1020 the NM 20 configures, or reconfigures in the case of updates, the VNF operation parameters and data within the DC nodes 35 at the slice level. In step 1025 the NM 20 instantiates the required SOM/s-opt-mgmt 45 for the slice instance. In step 1030 the NM 20 configures, or reconfigures in the case of updates, the SOM/s-opt-mgmt parameters and data including slice logical topology.

The slice usage configuration, or update, procedure 1035 includes the SOM 45 configuring, or reconfiguring in the case of an update, VNF optional parameters and data within DC nodes 35 common to all service instances 1040. The SOM 45 also configures, or reconfigures in the case of an update, VNF operation parameters and data within DC nodes 35 specific to particular service instances 1045. The slice usage configuration procedure 1035 is an optional procedure to scale consumed network resources within the limits set during the slice creation, or update, procedure 1002. As illustrated, in some aspects inter-SOM communication 1037 may be provided to provide the results of the slice usage configuration procedure 1035 to other SOMs 45. The inter-SOM communication 1037 permits communication of slice usage within the current slice to SOMs 45 of other slices. This may allow a SOM 45 that is not associated with a slice to take up any resourced released by a slice when the slice resources are to be scaled down, or to release resources if the slice resources are to be scaled back up.

Figure 17A:
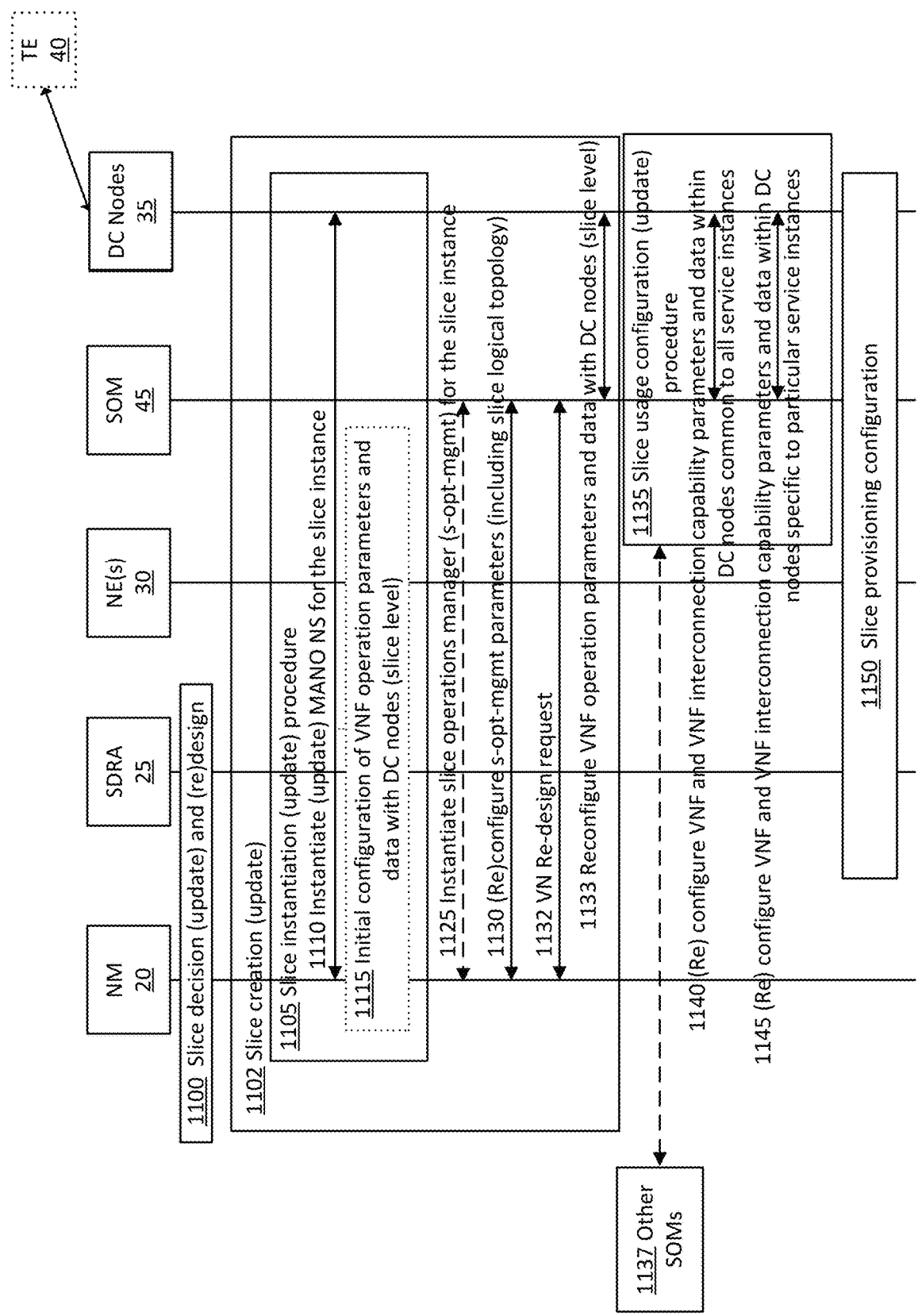
FIG. 17A is a signalling diagram illustrating an embodiment of combinations of slice creation, configuration and re-design functions based on the table of FIG. 5A.

FIG. 17A is a signalling diagram illustrating an embodiment of combinations of slice creation, configuration and re-design functions based on row D of the table of FIGS. 5A and B. In step 1100 the NM 20 determines the slice requirements for slice creation. As noted above, this determination may be performed in accordance with requirements provided in a slice creation request received from the $3^{rd}$ party. As the steps are also applicable to slices that are being reconfigured (i.e., re-designed), the brackets denote inclusion of reconfiguration or re-design operations in addition to initial slice set up and creation operations.

In the embodiment of FIG. 17A, the SOM 45 is responsible for identifying a need for re-design or reconfiguration of the network slice, as indicated in FIGS. 5A and 5B.

Step 1102 identifies the slice creation, or update, operations, while step 1135 identifies slice usage configuration, or update, operations. Slice usage may be any fraction of the slice resources initially allocated during step 1102 slice creation, or update, operations. As indicated above, an important utility of slice usage configuration, update, procedures, is to allow for excess network resources that are allocated to the slice, to be released. Step 1150 relates to slice provisioning configuration, and supporting the slice maintenance functions during the life of the slice.

Slice creation, or update, operations 1102 includes the slice instantiation, or update, procedure 1105, slice operations manager (SOM or s-opt-mgmt 45) instantiation 1125, and s-opt-mgmt parameter configuration 1130. The slice instantiation, or update, procedure 1105 includes the instantiation, or update, of the MANO NS for the slice instance 1110. The instructions associated with the instantiation or update of the MANO NS are sent by the NM 20 to the DC node(s) 35. In step 1115 the NM 20, in communication with the SDRA 25 and one or more NE(s) 30, configures, or reconfigures in the case of an update, the physical paths between DC nodes 35 for the slice instance. In step 1125 the NM 20 instantiates the required SOM/s-opt-mgmt 45 for the slice instance. In step 1130 the NM 20 configures, or reconfigures in the case of updates, the SOM/s-opt-mgmt parameters and data including slice logical topology. In step 1132 the NM 20 exchanges a VN Re-design request with the SOM 45. In step 1133 the SOM 45 configures, or reconfigures in the case of an update, the VNF operation parameters and data with DC nodes 35 at the slice level.

The slice usage configuration, or update, procedure 1135 includes the SOM 45 configuring, or reconfiguring in the case of an update, VNF optional parameters and data within DC nodes 35 common to all service instances 1140. The SOM 45 also configures, or reconfigures in the case of an update, VNF operation parameters and data within DC nodes 35 specific to particular service instances 1145. The slice usage configuration procedure 1135 is an optional procedure to scale consumed network resources within the limits set during the slice creation, or update, procedure 1102. As illustrated, in some aspect external SOM communication 1137 may be provided to provide the results of the slice usage configuration procedure 1135 to external SOMs 45. The external SOM communication 1137 permits communication of slice usage within the current slice to external SOMs 45 of other slices, which may allow the external SOMs 45 to take up any released resources if the slice resources are to be scaled down, or to release resources if the slice resources are to be scaled back up.

Figure 17B:
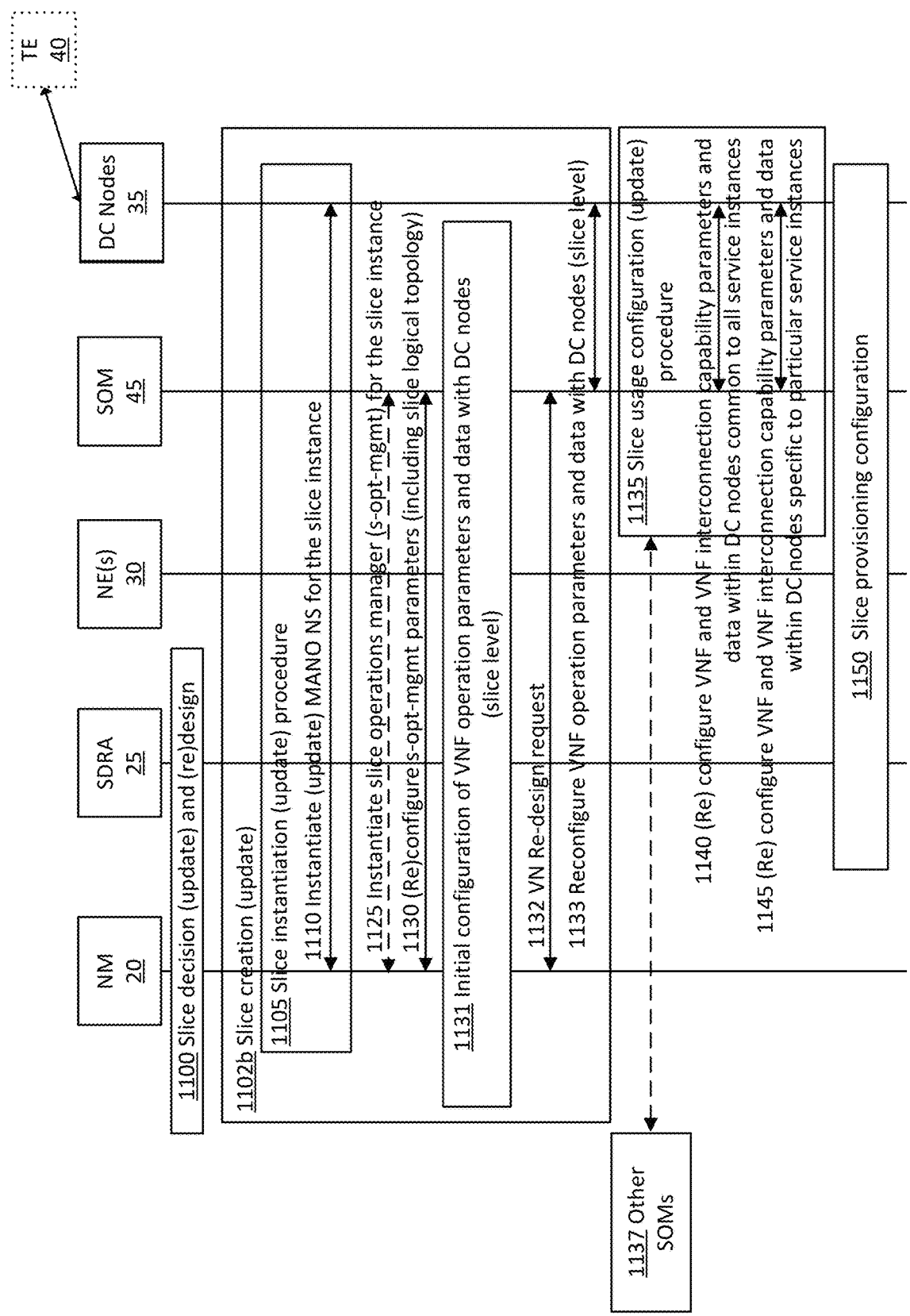
FIG. 17B is a signalling diagram illustrating an embodiment of combinations of slice creation, configuration and re-design functions based on the table of FIG. 5A; and, FIG. 18 is a signalling diagram illustrating an embodiment of combinations of slice creation, configuration and re-design functions based on the table of FIG. 5A.

FIG. 17B is a signalling diagram illustrating an embodiment of combinations of slice creation, configuration and re-design functions based on row E of the table of FIGS. 5A and B.

In FIG. 17B, the SOM 45 is further operative to manage initial NF configuration of the network slice, as indicated in FIGS. 5A and 5B.

In step 1100 the NM 20 determines the slice requirements for slice creation. As the steps are also applicable to slices that are being reconfigured (i.e., re-designed), the brackets denote inclusion of reconfiguration or re-design operations in addition to initial slice set up and creation operations.

Step 1102b identifies the slice creation, or update, operations, while step 1135 identifies slice usage configuration, or update, operations. Slice usage may be any fraction of the slice resources initially allocated during step 1102b slice creation, or update, operations. As indicated above, an important utility of slice usage configuration, update, procedures, is to allow for excess network resources that are allocated to the slice, to be released. Step 1150 relates to slice provisioning configuration, and supporting the slice maintenance functions during the life of the slice.

Slice creation, or update, operations 1102b includes the slice instantiation, or update, procedure 1105, slice operations manager (SOM or s-opt-mgmt 45) instantiation 1125, and SOM/s-opt-mgmt parameter configuration 1130. The slice instantiation, or update, procedure 1105 includes the instantiations, or update, of the MANO NS for the slice instance 1110.

In this embodiment, the initial configuration of VNF operation parameters and data is not performed in coordination with the MANO NS.

The instructions associated with the instantiation or update of the MANO NS are sent by the NM 20 to the DC node(s) 35. In step 1125 the NM 20 instantiates the required SOM/s-opt-mgmt 45 for the slice instance. In step 1130 the NM 20 configures, or reconfigures in the case of updates, the SOM/s-opt-mgmt parameters and data including slice logical topology. In step 1131 the NM 20, in communication with the SDRA 25, one or more NE(s) 30, and the SOM 45 configures, or reconfigures in the case of an update, the paths between DC nodes 35 for the slice instance.

As indicated above in relation to step 1105, step 1132 occurs without interaction with the MANO NS.

In step 1132 the NM 20 exchanges a VN Re-design request with the SOM 45. In step 1133 the SOM 45 configures, or reconfigures in the case of an update, the VNF operation parameters and data with DC nodes 35 at the slice level.

The slice usage configuration, or update, procedure 1135 includes the SOM 45 configuring, or reconfiguring in the case of an update, VNF optional parameters and data within DC nodes 35 common to all service instances 1140. The SOM 45 can also configure, or reconfigure in the case of an update, VNF operation parameters and data within DC nodes 35 specific to particular service instances 1145. The slice usage configuration procedure 1135 is an optional procedure to scale consumed network resources within the parameters defined during the slice creation, or update, procedure 1102b. As illustrated, in some aspects inter-SOM communication 1137 may be performed to provide the results of the slice usage configuration procedure 1135 to other SOMs 45. The inter-SOM communication 1137 permits communication of slice usage within the current slice to SOMs 45 of other slices, which may allow the other SOMs 45 to take up any released resources when the slice resources are scaled down, or to release resources if the slice resources are to be scaled back up.

Figure 18:
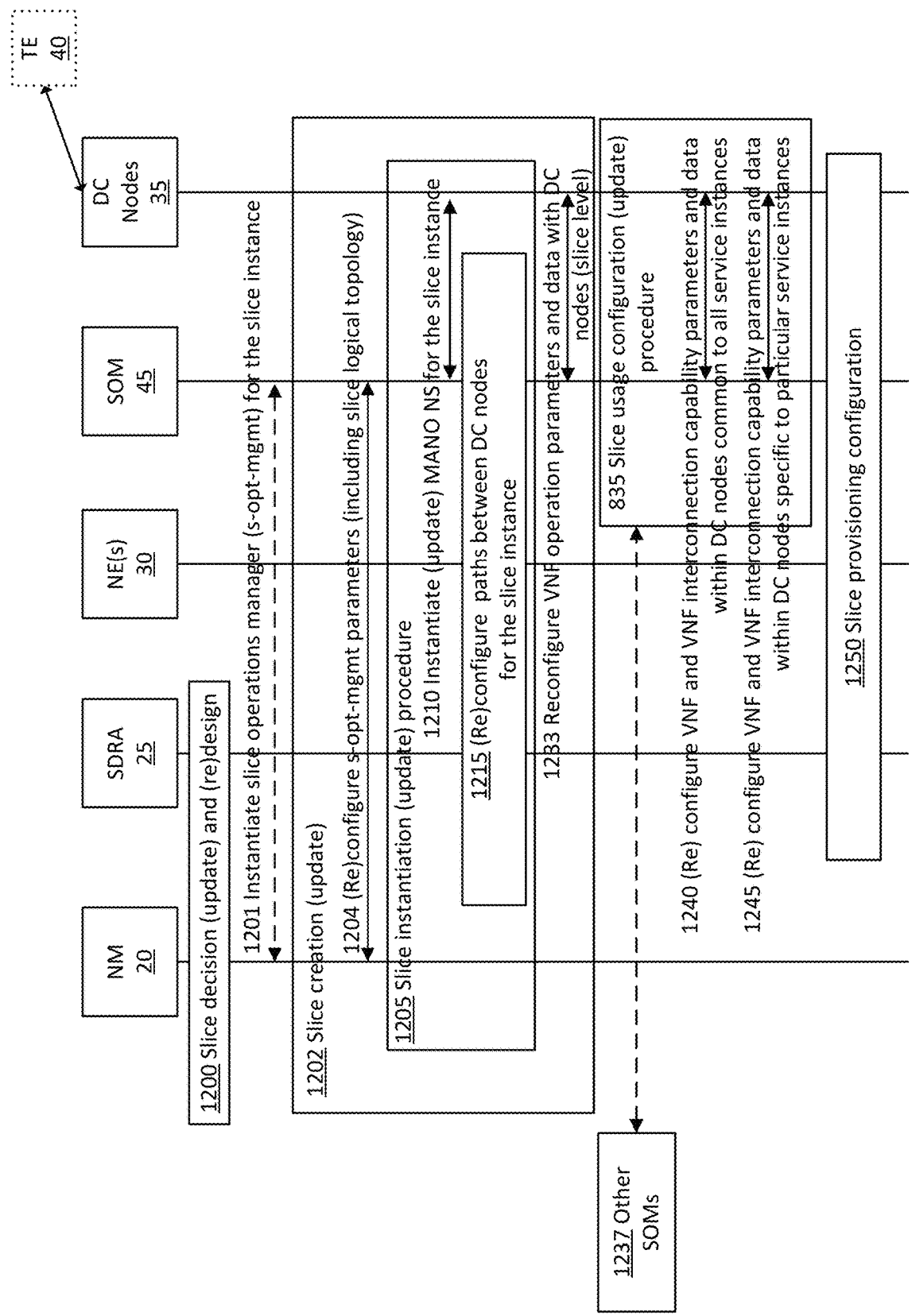

FIG. 18 is a signalling diagram illustrating an embodiment of combinations of slice creation, configuration and re-design functions based on row F of the table of FIGS. 5A and B. In step 1200 the NM 20 determines the slice requirements for slice creation. As the steps are also applicable to slices that are being reconfigured (i.e., re-designed), the brackets denote inclusion of reconfiguration or re-design operations in addition to initial slice set up and creation operations. In step 1201 the NM 20 instantiates a slice operations manager (SOM/s-opt-mgmt 45) for the slice instance.

In the embodiment of FIG. 18, the SOM 45 is further operative to manage slice instantiation, as indicated in FIGS. 5A and 5B.

Step 1202 identifies the slice creation, or update, operations, while step 835 identifies slice usage configuration, or update, operations. Slice usage may be any fraction of the slice resources initially allocated during step 1202 slice creation, or update, operations. As indicated above, an important utility of slice usage configuration, update, procedures, is to allow for excess network resources that are allocated to the slice, to be released. Step 1250 relates to slice provisioning configuration, and supporting the slice maintenance functions during the life of the slice.

Slice creation, or update, operations 1202 includes the slice instantiation, or update, procedure 1205, and reconfiguration of VNF operation parameters and data 1233. The slice instantiation, or update, procedure 1205 includes the instantiation, or update, of the MANO NS for the slice instance 1210. The instructions associated with the instantiation, or update, of the MANO NS are sent by the NM 20 to the DC node(s) 35. In step 1215, the SOM 45 can transmit instructions to the SDRA 25 for the configuration (or reconfiguration) of the paths between DC nodes 35 in the slice instance. In step 1233 the SOM 45 configures, or reconfigures in the case of an update, the VNF operation parameters and data with DC nodes 35 at the slice level.

The slice usage configuration, or update, procedure 1235 includes the SOM 45 configuring, or reconfiguring in the case of an update, VNF optional parameters and data within DC nodes 35 common to all service instances 1240. The SOM 45 also configures, or reconfigures in the case of an update, VNF operation parameters and data within DC nodes 35 specific to particular service instances 1245. The slice usage configuration procedure 1235 is an optional procedure to scale consumed network resources within the limits set during the slice creation, or update, procedure 1202. As illustrated, in some aspect inter-SOM communication 1237 may be provided to provide the results of the slice usage configuration procedure 1235 to other SOMs 45. The inter-SOM communication 1237 permits communication of slice usage within the current slice to SOMs 45 of other slices, which may allow the other SOMs to take up any released resources when the slice resources are to be scaled down, or to release resources if the slice resources are to be scaled back up.

In accordance with embodiments of the present application, there is provided a management system for a communications network, comprising: a network manager comprising a computer processor having a memory and a network interface; and one or more slice operations manager in communication with the network manager, wherein each of said one or more slice operations manager is configured for management of at least one network slice.

In accordance with embodiments of the present application, there is provided a slice operations manager comprising a computer processor having a memory and a network interface, wherein the slice manager is configured to direct underlying resources for creation, modification, termination, and performance monitoring of service instances within a network slice instance.

In accordance with further embodiments of the application, there is provided a method of managing a communications network, comprising: instantiating, by a network manager, a network slice within the communications network by: determining a need for a network slice; configuring the network slice; and instantiating, by the network manager, a slice operations manager associated with the network slice, which is configured to direct underlying resources for creation, modification, termination, and performance monitoring of service instances within a network slice instance, wherein, following instantiation of the network slice and the associated slice operations manager, the slice operations manager is responsible for management of the network slice.

In an implementation, the present application provides for a management exposure interface to enable external control over slice formation, configuration, and re-design operations. In general, an external entity is provided with visibility and optionally control over one or more slice management options through the management exposure interface. The external entity may have no direct connection to the network manager controlling the network slice, and accordingly the management exposure interface provides the sole access point for control over network slice operations. In other cases the external entity may comprise the network operator, or another network entity, and it is convenient to provide control over network slice management operations through the management exposure interface.

In an aspect, different levels of management exposure may be selectively provided through the management exposure interface. Control over the management exposure interface may be retained by a network operator, or may be selectively extended to "third party" entities that don't otherwise have access to control operations required to control slice operations management. The management exposure interface may be realized by a management exposure function operative on the network. In some aspects, the management exposure function may be operative to authenticate and/or authorize the external party before providing visibility and/or control over the management operations of the network slice.

In an embodiment, a management system for a communications network, comprising: a network manager (NM) operative to manage operations of one or more network slices; and, a management exposure function (MEF) operative to provide access to a selected one or more of the operations to an external entity that is not in operative communication with the network manager.

In an implementation, the selected one or more of the operations comprise at least one of creation, modification, termination, and performance monitoring of the one or more network slices.

In an implementation, the selected one or more of the operations may be differentiated based upon an identity of the external entity.

In an implementation, the selected one or more of the operations may be differentiated based upon an identity of a network slice of the one or more network slices being managed by the operations.

In an implementation, the MEF is further operative to communicate an identity of the selected one or more operations to the external entity.

In an implementation, the MEF is further operative to provide access to a different set of the one or more operations to manage operations of each of two or more services available on the one or more network slices.

In an implementation, the system further comprises a slice operations manager (SOM), and wherein the NM and the SOM are operative to jointly manage the operations. The SOM may be operative to communicate with at least one other SOM managing a different network slice, and wherein the SOM is operative to temporarily release to the at least one other SOM network resources allocated to the one or more network slices. The SOM may be operative to communicate with at least one other SOM managing a different network slice, and wherein the SOM is operative to temporarily expand network resources available to the one or more network slices by accepting from the at least one other SOM other network resources allocated to the different network slice.

The SOM may be operative to receive network resource instructions from the external entity through the MEF, the network resource instructions directing the SOM to temporarily release or expand the network resources available to the one or more network slices. The SOM may be operative to communicate with at least one other SOM managing a different network slice, and wherein the SOM is further operative to temporarily grant use of released network resources to the at least one other SOM, or to temporarily obtain use of other network resources managed by the at least one other SOM to expand the network resources available to the one or more network slices.

In an embodiment, the system further comprises a charging entity, and wherein the charging entity is operable to credit the external entity for releasing the network resources, and to debit the external entity for expanding the network resources.

In an implementation, the management exposure function is operative to receive input from the external entity to increase or decrease network resources available to the network slice. In an implementation, the management exposure function is further operative to configure virtual network functions (VNFs) and VNF interconnection capability parameters and data in order to increase or decrease the network resources available to the network slice.

In an implementation, the MEF is further operative to authenticate and/or authorize the external entity before providing access to the selected one or more of the operations.

In an embodiment, a method is provided for managing a communications network including a network manager (NM) operative to manage operations of one or more network slices available on the communications network, the method comprising a management exposure function: receiving input from an external entity that is not in operative communication with the NM; extending access to one or more slice operation management functions to the external entity to enable operational management control over the one or more network slices.

In an embodiment, the extending access further comprises communicating an identity of the selected one or more operations to the external entity.

In an embodiment, the method further comprises a charging entity, crediting the external entity for releasing the network resources, and debiting the external entity for expanding the network resources.

In an embodiment, the method further comprises the management exposure function receiving input from the external entity to increase or decrease network resources available to the network slice.

In an embodiment, wherein the method further comprises the management exposure function configuring virtual network functions (VNFs) and VNF interconnection capability parameters and data in order to increase or decrease the network resources available to the network slice.

In an embodiment, the method further comprises the MEF authenticating and/or authorizing the external entity before providing access to the selected one or more of the operations.

It will be readily understood that, throughout the preceding discussion, the above-described network functionalities and operations may correspond to a method for use in supporting operation of a communication network, such as a 5G wireless communication network. The method may involve computer-implemented functions, namely functions which are implemented by one or more computing, communication and/or memory components of the network infrastructure. These components may take various forms, such as specific servers or general-purpose computing, communication and/or memory devices which are configured to provide the required functionality through virtualization technologies. The method may involve the operation of one or more network components in order to improve the operation of the network. As such, with the communication network viewed as an apparatus, embodiments of the present invention may be directed to improving internal operations of the communication network.

Further, it will be readily understood that embodiments of the present invention relate to a communication network system or associated apparatus thereof, which is configured to perform the above-described network functionalities and operations. Again, the system or apparatus may comprise one or more computing, communication and/or memory components of the network infrastructure, which may take various forms, such as specific servers or general-purpose computing, communication and/or memory devices which are configured to provide the required functionality through virtualization technologies. Various methods as disclosed herein may be implemented on one or more real or virtual computing devices, such as devices within a communication network control plane, devices operating in the data plane, or a combination thereof. Computing devices used to implement method operations may include a processor operatively coupled to memory, the memory providing instructions for execution by the processor to perform the method as described herein.

Various embodiments of the present invention utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

All publications, patents and patent applications mentioned in this Specification are indicative of the level of skill of those skilled in the art to which this invention pertains and are herein incorporated by reference to the same extent as if each individual publication, patent, or patent applications was specifically and individually indicated to be incorporated by reference.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:
1. A slice operations manager (SOM) comprising:
 a network interface for receiving data from and transmitting data to network functions connected to a network;
 a processor; and
 a non-transient memory for storing instructions that when executed by the processor cause the SOM, when instantiated by a network manager (NM) managing a plurality of slice instances on the network, to be operative to:

manage at least one operation of at least one slice instance of the plurality of slice instances based on SOM parameters provided by the NM;
receive, from a third party, configuration instructions for the at least one slice instance; and
configure the at least one slice instance based on the configuration instructions, the configuration instructions received from a third party through a management exposure function (MEF), the MEF validating the configuration instructions.

2. The SOM of claim 1, wherein the non-transient memory stores further instructions that when executed configure the SOM to be operative to perform at least one of:
instantiation of the at least one slice instance;
configuration of at least one network function of the at least one slice instance; and
termination of the at least one slice instance.

3. The SOM of claim 1, wherein the non-transient memory stores further instructions that when executed configure the SOM to be operative to:
receive, from the NM configuration instructions for the at least one slice instance; and,
configure the at least one slice instance based on the received configuration instructions.

4. The SOM of claim 1, wherein the non-transient memory stores further instructions that when executed configure the SOM to be operative to: transmit, to the NM, a request for additional resources; receive, from the NM, an allocation of resources; and, reconfigure the at least one slice instance based on the allocation of resources.

5. A method executed by a slice operations manager (SOM) instantiated by a network manager (NM) operative to manage a plurality of slice instances on the network, the method comprising:
managing at least one operation of at least one slice instance independent from, the remaining plurality of slice instances, based on SOM parameters provided by the NM;
receiving, from a third party, configuration instructions for the at least one slice instance; and;
configuring the at least one slice instance based on the configuration instructions, the configuration instructions received from a third party through a management exposure function (MEF), the MEF validating the configuration instructions.

6. The method of claim 5, wherein the SOM parameters comprise at least a slice logical topology for the at least one slice instance.

7. The method of claim 5, wherein the SOM is operative to manage, for the at least one slice instance, at least one of:
slice instance and related management plane data;
adaptation to configuration and policy changes as prescribed by the NM for the slice instance;
configuration management for the slice instance;
releasing unnecessary resources allocated to the slice instance;
requesting more resources for the respective slice instance;
monitoring slice-specific data processing and performance for the slice instance;
keeping track of policy, control, and resource related aspects of individual service instances provided by the slice instance;
service instance creation, monitoring, modification, and termination within the slice instance; and,
fault and performance management of the slice instance.

8. The method of claim 5, further comprising at least one of:
instantiating the at least one slice instance;
configuring at least one network function of the at least one slice instance; and
terminating the at least one slice instance.

9. The method of claim 5, further comprising the SOM:
receiving, from the NM configuration instructions for the at least one slice instance; and,
configuring the at least one slice instance based on the received configuration instructions.

10. The method of claim 5, further comprising the SOM:
identifying a need to reconfigure the at least one slice instance to meet service requirements; and,
reconfiguring the at least one slice instance based on the allocation of resources.

11. The method of claim 5, further comprising the SOM:
transmitting, to the NM, a request for additional resources;
receiving, from the NM, an allocation of resources; and,
reconfiguring the at least one slice instance based on the allocation of resources.

12. The method of claim 5, further comprising the SOM:
monitoring slice usage of the at least one slice instance;
determining, based on the SOM parameters and the slice usage, that additional resources are required to meet service requirements of the at least one slice instance; and,
reconfiguring the at least one slice instance based on the allocation of resources.

13. The method of claim 5, wherein the SOM is further operative to perform one or more operations including:
initial configuration of the at least one slice instance;
configuration of the at least one slice instance;
reconfiguration of the at least one slice instance;
monitoring slice usage of the at least one slice instance;
reconfiguring the at least one slice instance based on slice usage;
slice provisioning configuration of the at least one slice instance; and,
slice provisioning reconfiguration of the at least one slice instance.

14. The method of claim 5 wherein the SOM is operative to perform a different one or more operations, based on an identity of the at least one slice instance.

15. The method of claim 5, further comprising the SOM communicating with at least one other SOM managing a different slice instance, and subsequently at least one of:
temporarily releasing to the at least one other SOM network resources allocated to the at least one slice instance; and
temporarily expanding network resources available to the at least one slice instance by accepting from the at least one other SOM other network resources allocated to the different slice instance.

16. The SOM of claim 1 wherein the at least one slice instance is instantiated based on a VN service descriptor, the VN service descriptor defining the network requirements for an SLA.

17. The method of claim 13 wherein the at least one slice instance is instantiated based on a VN service descriptor, the VN service descriptor defining the network requirements for an SLA.

18. A communication system comprising at least one processor and a memory storing instructions for execution by the at least one processor to implement a slice operations manager (SOM), a network manager (NM) and a management exposure function (MEF), the SOM, the NM and the MEF being communicatively coupled through an interface wherein
the SOM is configured to:
manage at least one operation of at least one slice instance of the plurality of slice instances based on SOM parameters provided by the NM;
receive configuration instructions for the at least one slice instance through a management exposure function (MEF); and
configure the at least one slice instance based on the configuration instructions;
the NM is configured to: provide the SOM parameters to the SOM; and
the MEF is configured to: validate the configuration instructions before sending the configuration instructions to the SOM.

19. The communication system according to claim 18, wherein the instructions for execution by the at least one processor further implements a third party configured to: send the configuration instructions for the at least one slice instance to the SOM through the MEF.

20. The communication system according to claim 18, wherein the SOM is configured to manage, for the at least one slice instance, at least one of:
slice instance and related management plane data;
adaptation to configuration and policy changes as prescribed by the NM for the slice instance;
configuration management for the slice instance;
releasing unnecessary resources allocated to the slice instance;
requesting more resources for the respective slice instance;
monitoring slice-specific data processing and performance for the slice instance;
keeping track of policy, control, and resource related aspects of individual service instances provided by the slice instance;
service instance creation, monitoring, modification, and termination within the slice instance; and
fault and performance management of the slice instance.

21. The communication system according to claim 18, wherein the SOM is further configured to:
identify a need to reconfigure the at least one slice instance to meet service requirements; and
reconfigure the at least one slice instance based on the allocation of resources.

22. The communication system according to claim 18, wherein the SOM is further configured to:
monitor slice usage of the at least one slice instance;
determine, based on the SOM parameters and the slice usage, that additional resources are required to meet service requirements of the at least one slice instance; and,
reconfigure the at least one slice instance based on the allocation of resources.

23. The communication system according to claim 18, wherein the SOM is further configured to perform one or more operations including:
initial configuration of the at least one slice instance;
configuration of the at least one slice instance;
reconfiguration of the at least one slice instance;
monitoring slice usage of the at least one slice instance;
reconfiguring the at least one slice instance based on slice usage;
slice provisioning configuration of the at least one slice instance; and,
slice provisioning reconfiguration of the at least one slice instance.

24. The communication system according to claim 18, wherein the SOM is further configured to communicate with at least one other SOM managing a different slice instance, and wherein the SOM is configured to perform one of:
a temporary release of resources allocated to the at least one slice instance to the at least one other SOM network; and
a temporary expansion of network resources available to the at least one slice instance by accepting from the at least one other SOM other network resources allocated to the different slice instance.

* * * * *